US005940083A

United States Patent [19]
Broekhuijsen

[11] Patent Number: 5,940,083
[45] Date of Patent: Aug. 17, 1999

[54] MULTI-CURVE RENDERING MODIFICATION APPARATUS AND METHOD

[75] Inventor: Jerome A. Broekhuijsen, Highland, Utah

[73] Assignee: Novell, Inc., Provo, Utah

[21] Appl. No.: 08/831,393

[22] Filed: Apr. 1, 1997

[51] Int. Cl.$^6$ .................................................. G06F 15/00
[52] U.S. Cl. ............................................................ 345/442
[58] Field of Search .................................. 345/441, 442, 345/443, 440, 133, 134, 135

[56] References Cited

U.S. PATENT DOCUMENTS

| | | | |
|---|---|---|---|
| 4,674,058 | 6/1987 | Lindbloom et al. ..................... | 364/518 |
| 5,241,654 | 8/1993 | Kai et al. ................................. | 395/142 |
| 5,304,988 | 4/1994 | Seto ......................................... | 341/141 |
| 5,408,598 | 4/1995 | Pryor, Jr. ................................. | 394/142 |
| 5,497,451 | 3/1996 | Holmes ................................... | 395/120 |
| 5,577,177 | 11/1996 | Collins et al. .......................... | 395/169 |
| 5,583,977 | 12/1996 | Seidl ....................................... | 395/133 |
| 5,877,775 | 3/1999 | Theisen et al. ......................... | 345/440 |

OTHER PUBLICATIONS

Dahlgren, Kent, "Putting Graphical Interfaces into Perspective", *Dr. Dobb's Journal*, Nov. 1988, pp. 32–41.
Kass, Michael, et al., "Snakes: Active Contour Models," *International Journal of Computer Vision*, (1988), pp. 321–331.
Swaine, Michael, "A Conversation with Robert Carr, Part I", *Dr. Dobb's Journal*, Nov. 1991, pp. 14–28.
Roulier, John A., "Specifying the arc length of Bézier curves," *Computer Aided Geometric Design 10*, (1993), pp. 25–56.
Farin, Gerald, "Curves and Surfaces for Computer Aided Geometric Design," *Computer Science and Scientific Computing*, 3rd Ed., (1993), pp. 189–191.
Finkelstein, Adam et al., "Multiresolution Curves," *Computer Graphics Proceedings*, (1994), pp. 261–268.
Hewlett–Packard, "Index (E–O)", Nov. 1991.
Hewlett–Packard, "Index (S–Z)", Nov. 1991.
Hewlett–Packard, "Knot Vectors", Nov. 1991.
Hewlett–Packard, "What's a B–Spline Look Like, Anyway?", Nov. 1991.
Hewlett–Packard, "ARTCore AR_Trimmingcurve(3G)", May 1992.
Hewlett–Packard, "Chapter 6 SBRR to ARTCore Conversion", May 1992.
Hewlett–Packard, "Table of Contents for Starbase Reference", Aug. 1992.
Hewlett Packard, "Bezier Surface Modeling", Feb. 1995.
Hewlett Packard, "MTrace", Feb. 1995.

*Primary Examiner*—Phu K. Nguyen
*Attorney, Agent, or Firm*—Madson & Metcalf

[57] ABSTRACT

A multi-curve object may be created as a graph of nodes interconnected by edges or links. Each node may be represented by a data structure containing a curve characterization corresponding to a sub-sequence of points selected from a sequence represented by the multi-curve object. Each node may include reference pointers or other links indicating the edges or links between nodes in the graph. A selection key in each node data structure may represent an attribute of the curve segment characterized in the node. A single, universal error for all curve segments is a suitable selection criterion. A member compound curve representing the multi-curve object may be selected by including curve segments associated with all nodes that meet a user-selected selection criterion. A rendition of the member compound curve so created may be modified at will by changing the selection criterion. A recursive modification, rendition, un-rendering, and re-rendering procedure may be implemented to minimize rendering times. Only those curve-segments associated with nodes that have been selected for removal or addition to a member compound curve need to be affected by rendering and un-rendering processes. Thus, an image need not be completely un-rendered to be replaced by a very similar replacement image, only selected portions need be.

44 Claims, 19 Drawing Sheets

| SEQUENCE/SEGMENT | $A_0$ | $C_0$ | $C_1$ | $A_1$ |
|---|---|---|---|---|
| A | (2, 24) | (14.505, 15.328) | (-6.822, 7.047) | (7, 1) |
| B | (2, 24) | (11.447, 19.$\overline{666}$) | (-0.954, 15.$\overline{333}$) | (7, 11) |
| C | (7, 11) | (-9.540, 11.902) | (-0.540, 0.098) | (7, 1) |
| D | (2, 24) | (8.$\overline{666}$, 22.$\overline{333}$) | (5.$\overline{333}$, 20.$\overline{666}$) | (7, 19) |
| E | (7, 19) | (2.780, 16.$\overline{333}$) | (2.780, 13.$\overline{666}$) | (7, 11) |
| F | (7, 19) | (5.$\overline{666}$, 17.$\overline{666}$) | (4.$\overline{333}$, 16.$\overline{333}$) | (3, 15) |
| G | (3, 15) | (4.$\overline{333}$, 13.$\overline{666}$) | (5.$\overline{666}$, 12.$\overline{333}$) | (7, 11) |

*Fig. 14*

MULTI-CURVE RENDERING MODIFICATION APPARATUS AND METHOD

BACKGROUND

1. The Field of the Invention

This invention relates to computer systems for generating graphic images and, more particularly, to novel systems and methods for minimizing the un-rendering and rendering of curves that are modified.

2. The Background Art

Line drawings of images are commonly produced and manipulated by graphics artists, illustrators, and increasingly broader sectors of computer users. Frequently, such images are composed of complex curves, resulting from either manual creation modes, such as those afforded by curve drawing tools, or quasi-automated creation modes, such as those afforded by tracing and autotracing tools Depending on the skill level of the computer user, creating curves on a computer can be a very difficult process. Manipulating (e.g. changing, editing, modifying) existing curves can pose even greater challenges to the computer user because of the tedium of using existing software tools, or the time consumed by using existing software tools, or the complexity of the curves to be manipulated.

In many cases, the desired manipulations of existing curves involve changing the level of detail or tightness (or, conversely, smoothness) of a curve relative to what it represents. More detailed (tighter) renditions of a curve may reflect improved fidelity in representing a desired feature or contour of an image. Less detailed (smoother) renditions of a curve may reflect improved abstraction or stylistic rendition relative to what a curve represents. Additional considerations in determining the optimal degree of tightness of a curve rendition may include the existence and extent of undesirable artifacts (such as from digital scans of scenes or other images) as well as primary and secondary memory requirements for storage of such curves. Circumstances dictating the degree of tightness or smoothness of a curve rendition may vary from person to person, application to application, or even time to time.

What is needed is a method and apparatus which permits even a relatively unskilled user to easily and quickly manipulate the tightness of rendition of existing curves, even very complex curves. For example, it would be of great benefit to be able to create, such as from existing curves or sequences of points produced by tracing and autotracing tools, a multi-curve object containing many potential renditions corresponding to a multitude of curve rendition tightnesses. Furthermore, it would be of great benefit to be able to efficiently effect minor (subtle) changes in tightness of complex curves by unrendering and re-rendering only those portions of the curves which change from one level of tightness to another level of tightness.

BRIEF SUMMARY AND OBJECTS OF THE INVENTION

In view of the foregoing, it is a primary object of the present invention to provide a method and apparatus for creating a multi-curve object, and for intelligently, efficiently, controllably, and selectively rendering, modifying, and re-rendering a member compound curve that may be used to represent a multi-curve object.

It is another object of the invention to provide an arbitrary selection by a user of an accuracy, precision, smoothness, or other selection criterion for determining selective curve segments to be included in a member compound curve representing a multi-curve object.

It is another object of the invention to provide a method and apparatus for selectively un-rendering curve segments that do not satisfy a new selection criterion, and to re-render in place thereof, certain other curve segments that do satisfy the new selection criterion, while leaving unchanged those curve segments that satisfy both a previous rendering criterion or selection criterion, as well as the new selection criterion or rendering criterion.

It is another object of the invention to provide an apparatus and method for creating a multi-curve object, to include all parameters required to generate all member compound curves that may be able to represent the multi-curve object, thus permitting a user to select any desired selection criterion ex post facto with respect to creation of the multi-curve object.

It is another object of the invention to provide a method and apparatus to permit a user to arbitrarily select any level of detail, accuracy, precision, smoothness, or the like for selecting (composing) and rendering a member compound curve of a multi-curve object, using a minimum number of parameter changes, such as a single value selected graphically from a scale indicating a level of a selection parameter mapped from a minimum value to a maximum value.

Consistent with the foregoing objects, and in accordance with the invention as embodied and broadly described herein, an apparatus and method are disclosed in one embodiment of the present invention as including data structures and hardware for generating a multi-curve object. A multi-curve object may represent a sequence of points having certain joints designated therein. The multi-curve object may be represented as a graph or tree of nodes, each node containing a curve characterization of a segment of a curve that may be fitted to a sub-sequence of the sequence of points. Each node also includes a selection key related to a parameter of interest associated with the curve segment of the node. For example, a selection key may correspond to an error of fit of the curve segment to the sub-sequence of points. Alternatively, the selection key may be based on color, or some other attribute of the node.

In addition, each node may include links to other nodes to form the "edges" or links of the graph connecting nodes to one another. In certain embodiments, a node may include lock information to determine portions of a graph that may be locked against modification or locked to provide stability of some parameter such as a rendering selection.

In certain embodiments, a method and apparatus in accordance with the invention may include recursive or iterative creation modules for creating the multi-curve object. Moreover, the recursive composition of a particular member compound curve representing a multi-curve object, by using only select nodes whose selection keys correspond to some selection criterion, may be provided in a module executable by a processor An intelligent, recursive rendering and un-rendering process may be provided in one or more modules to selectively render and un-render only those curve segments that so need to be affected to form a modified curve. When a selection criterion is changed to delete certain nodes or curve segments from an image, they are replaced by newly selected curve segments corresponding to nodes that meet a new selection criterion. A modification module may control the use of a recursive un-rendering/rendering process module for accomplishing such modifications.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of The accompanying drawings in which:

FIG. 14 is a table representing one embodiment of the curve characterizations corresponding to nodes used to represent a multi-curve object of FIGS. 12–13;

DETAILED DESCRIPTION OF THE PREFERRED EMBODIMENTS

Figure 1:
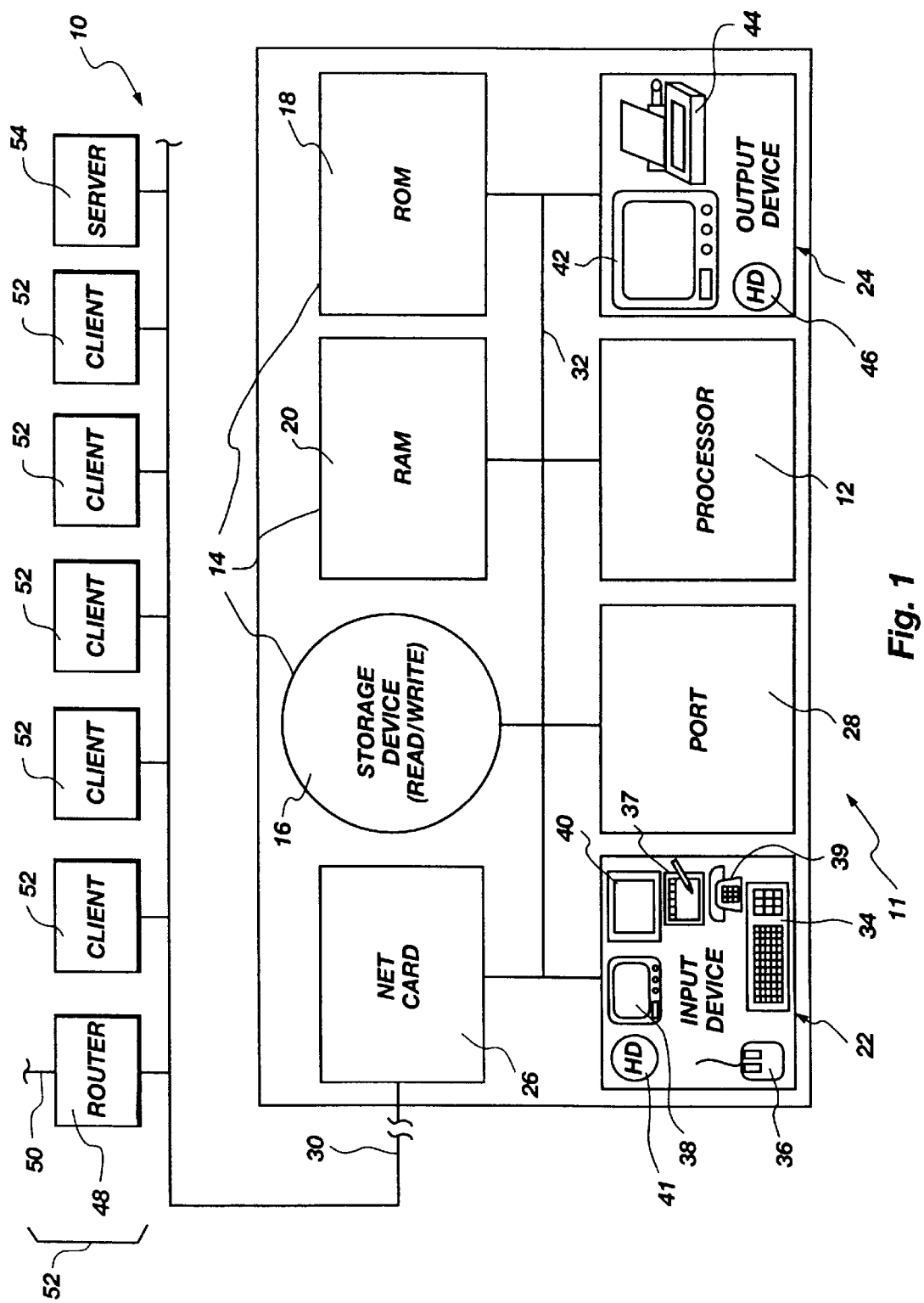
FIG. 1 is a schematic block diagram of an apparatus for implementing the executables and other data structures for creating, rendering, modifying, and intelligently re-rendering member compound curves corresponding to a multi-curve object in accordance with the invention.

It will be readily understood that the components of the present invention, as generally described and illustrated in the Figures herein, could be arranged and designed in a wide variety of different configurations. Thus, the following more detailed description of the embodiments of the system and method of the present invention, as represented in FIGS. 1 through 21, is not intended to limit the scope of the invention, as claimed, but is merely representative of the presently preferred embodiments of the invention.

The presently preferred embodiments of the invention will be best understood by reference to the drawings, wherein like parts are designated by like numerals throughout. As a convention herein, reference numerals may have trailing alphabet characters. The same reference numeral may be used without an alphabet character to refer to one, any, or all elements of which the trailing alphabet character indicates a single instance. Those of ordinary skill in the art will, of course, appreciate that various modifications to the detailed schematic diagrams of FIGS. 1–21 may easily be made without departing from the essential characteristics of the invention, as described in connection therewith. Thus, the following description of the detailed schematic diagrams of FIGS. 1–21 is intended only by way of example, and simply illustrates certain presently preferred embodiments of the invention as claimed herein.

Figure 2:
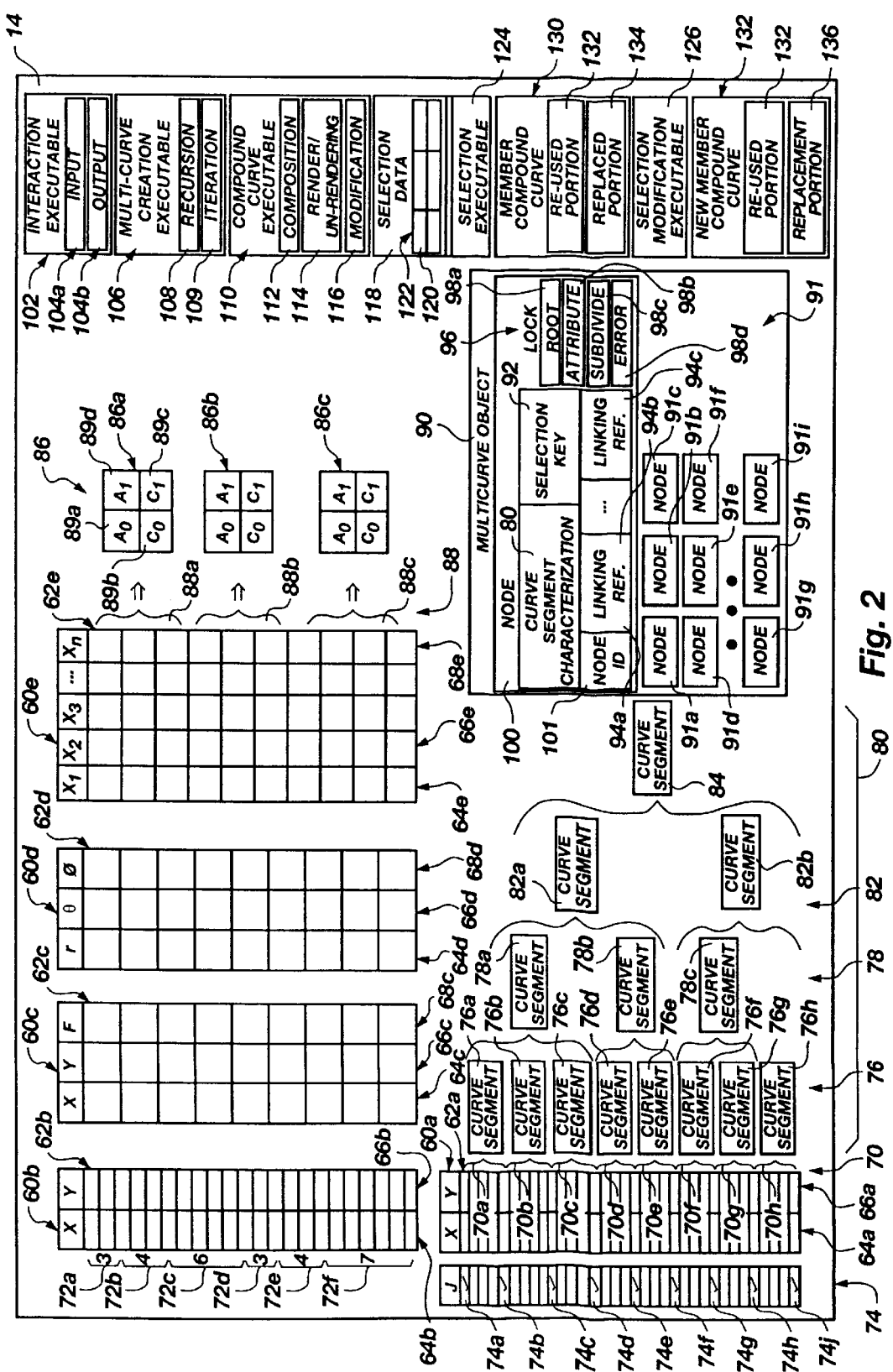
FIG. 2 is a schematic block diagram of executables and other data structures including sequences and associated nodes of a multi-curve object in accordance with the invention.

Referring now to FIGS. 1–21, an apparatus 10 may implement a multi-curve object 90 containing nodes 100 representing sub-sequences 70 of a sequence 60 (e.g. 60*a* or 60*b*, etc. in FIG. 2) of points 62 (e.g. 62*a*, or 62*d*, etc. in FIG. 2). Creation executables 106 for creating a multi-curve object 90 may be provided. An executable 110 may be provided for creating a member compound curve (332, 336 FIGS. 16–20, 350 FIG. 21) representing a multi-curve object 90 with selected curve segment characterizations 80 from selected nodes 100.

Various member compound curves 130, 131 may be created in accordance with certain selection criteria 122 selected by a user. A multi-curve 90 may be represented by a graph 160 created by a recursive building module 190. Alternatively, iterative process 109 or module 109 may create the multi-curve object 90.

Figure 10:
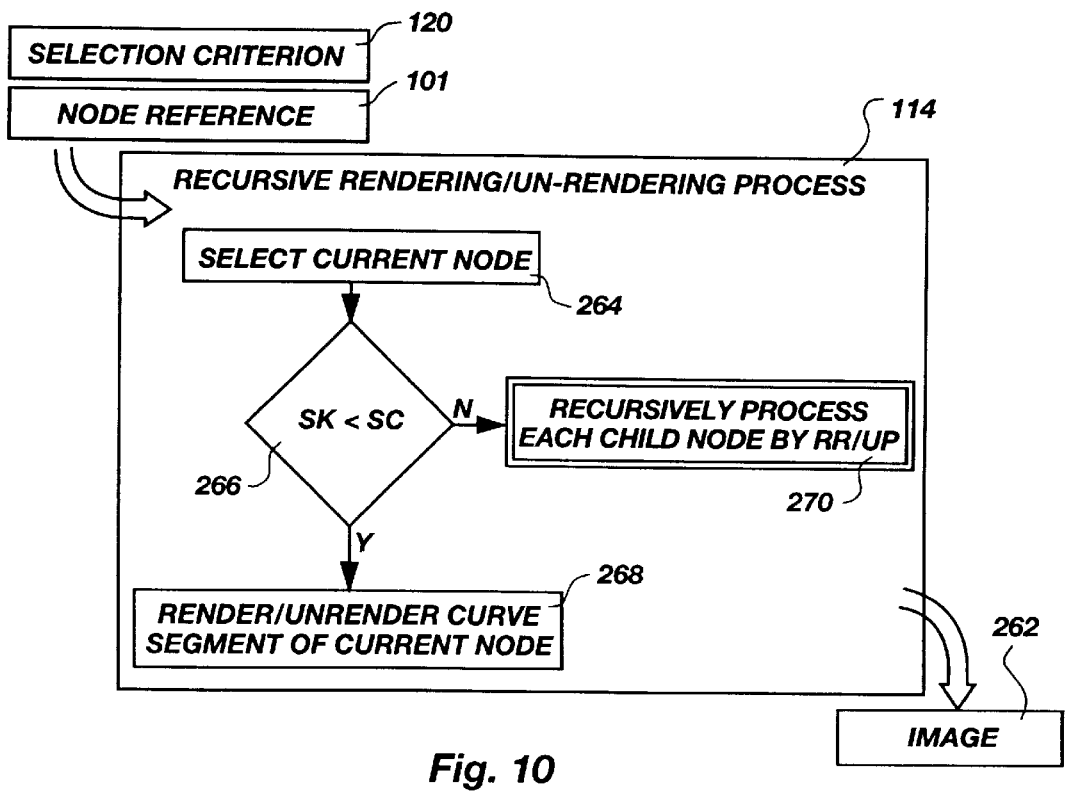
FIG. 10 is a schematic block diagram of a recursive rendering and un-rendering process that may be used for rendering or un-rendering selected curve segments corresponding to nodes in a member compound curve used to generate an image representing a multi-curve object.

A recursive composition process 112 may select various curve segments 80, from nodes 100 having selection keys 92 meeting some selection criterion 120. Individual curve segments 80 or curve segment characterizations 80 may be rendered in accordance with a recursive rendering/unrendering process 114 or module 114 to form an image 262 (FIG. 10).

A recursive rendition modification process 116 or module 116 may modify an image 262 by altering the particular nodes 100 whose curve segment characterizations 80 are included by virtue of their selection keys 92 meeting a new selection criterion 120. Examples are illustrated in FIGS. 12–20 and FIG. 21. Sequences of points are fitted with member compound curves having different numbers of segments contributing thereto.

Referring now to FIG. 1, an apparatus 10 may implement the invention on a single or multiple nodes, 11, (client 11, computer 11) containing a processor 12 or CPU (Central Processing Unit) 12. All components may exist in a single node 11 or may exist in multiple nodes 11 remote from one another. The CPU 12 may be operably connected to a memory device 14. A memory device 14 may include one or more devices such as a hard drive or (e.g. non-volatile) storage device 16, a read-only memory 18 (ROM) and a random access (and usually volatile) memory 20 (RAM).

The apparatus 10 may include an input device 22 for receiving inputs from a user or another device. Similarly, an output device 24 may be provided within the node 11, or accessible within the apparatus 10. A network card 26 (interface card) or port 28 may be provided for connecting to outside devices, such as the network 30.

Internally, a bus 32 may operably interconnect the processor 12, memory devices 14, input devices 22, output devices 24, network card 26 and port 28. The bus 32 may be thought of as a data carrier. As such, the bus 32 may be embodied in numerous configurations. Wire, fiber optic line, wireless electromagnetic communications by visible light, infrared, and radio frequencies may likewise be implemented as appropriate for the bus 32 and the network 30.

Input devices 22 may include one or more physical embodiments. For example, a keyboard 34 may be used for interaction with the user, as may a mouse 36. A touch screen 38, a telephone 39, or simply a telephone line 39, may be used for communication with other devices, with a user, or the like. Similarly, a scanner 40 may be used to receive graphical inputs which may or may not be translated to other formats. The hard drive 41 or other memory device 41 may be used as an input device whether resident within the node 11 or some other node 52 (e.g., 52a, 52b, etc.) on the network 30, or from another network 50.

Output devices 24 may likewise include one or more physical hardware units. For example, in general, the port 28 may be used to accept inputs and send outputs from the node 11. Nevertheless, a monitor 42 may provide outputs to a user for feedback during a process, or for assisting two-way communication between the processor 12 and a user. A printer 44 or a hard drive 46 may be used, for outputting information, as output devices 24.

In general, a network 30 to which a node 11 connects may, in turn, be connected through a router 48 to another network 50. In general, two nodes 11, 52 may be on a network 30, adjoining networks 30, 50, or may be separated by multiple routers 48 and multiple networks 50 as individual nodes 11, 52 on an internetwork. The individual nodes 52 (e.g. 52a, 52b, 52c, 52d) may have various communication capabilities.

In certain embodiments, a minimum of logical capability may be available in any node 52. Note that any or all of the individual nodes 52a–52d may be referred to as a node 52. Each of the nodes 52 may contain a processor 12 with more or fewer of the other supporting devices 14–44.

A network 30 may include one or more servers 54. Servers may be used to manage, store, communicate, transfer, access, update, and the like, any number of files for a network 30. Typically, a server 54 may be accessed by all nodes 11, 52 on a network 30. Nevertheless, other special functions, including communications, applications, and the like may be implemented by an individual server 54 or multiple servers 54.

In general, a node 11 may need to communicate over a network 30 with a server 54, a router 48, or nodes 52. Similarly, a node 11 may need to communicate over another network (50) in an internetwork connection with some remote node 52. Likewise, individual components 12–46 may need to communicate data with one another. A communication link may exist, in general, between any pair of devices.

Referring now to FIG. 2, a sequence 60 (e.g. 60a, 60b, 60c, etc.) of points may be represented in a variety of ways. For example, sequence 60a is a set of ordered pairs 62a or ordered tuples 62a. In general, a reference numeral followed by a trailing alphabet character indicates a particular instance of the item designated by the numerical reference. Thus, a sequence 60 may refer to any sequence, whereas the sequences 60a–60e illustrate particular instances or embodiments sequences 60. Each sequence 60 may be comprised of tuples 62, such as the ordered pairs 62a, 62b, and ordered triple 62c, and ordered triple 62d in a polar coordinate space, and the ordered n-tuples 62e.

In general, a tuple 62 may include several variables 64, 66, 68. For example, the first variables 64, and second variables 66, may typically represent an independent variable 64a, and an independent variable 66a, which simply exist in a two-dimensional space. Alternatively, a variable 64b may be an independent variable while a variable or function 66b represents a function 66b dependent on the independent variable 64b.

Similarly, an independent function F 68c may depend on multiple independent variables 64c, 66c. Thus, some number of variables (e.g. 64a–64e, 66a–66e, 68c–68e) may bear some functional relationship to one another over the domain of interest. A sequence 60 may be subdivided into different subsequences 70, 72. For example, the sequence 60a may be subdivided into the sub-sequences 70a–70h. Each sub-sequence 70 includes some number of points 62a of the sequence 60a. Similarly, examples of sub-sequences 72 include sub-sequences 72a–72f from the sequence 60b.

In general, a sequence 60 may be provided with joints 74. For example, each of the joints 74a–74j typically corresponds to a point 62a shared by two individual sub-sequences 70a–70h, respectively except for end points or end joints 74a, 74b. Joints 74 may be determined in advanced. Joints 74 typically may be located in a sequence 60 at a point 62 corresponding to a corner, change, inflection point, midpoint, or other convenient position within a sequence 60. For example, a sharp turn, a discontinuity of a first derivative of a curve, may be an easily-identifiable joint 74. Thus, two different, distinctive curves may be fitted to two different subsequences 70 in a sequence 60, each sharing a joint 74. In one example, the sub-sequence 70a shares the joint 74d with the sub-sequence 70b. Similarly, the sub-sequence 70g shares the joint 74h with the sub-sequence 70h. Inasmuch as the sequence 60a is open, does not end and begin at the same point 62, the joints 74a, 74j form end points 74a, 74j for the sequence 60a.

In general, a sequence 60 or a sub-sequence 70 may be fitted with one or more curve segments 76. For example, the curve segments 76a–76h may represent polynomials, exponentials, or other forms of curves fitted to each of the respective sub-sequences 70a–70h, respectively. Similarly, different sub-sequences 70 may be created.

In general, any sequence 60 may be subdivided into sub-sequences 70. Similarly, different sub-sequences 70 may be consolidated into a different sub-sequences 70 or sequences 60. Thus, the expressions "sequence" 60 or "sub-sequence" 70 are some what arbitrary. Each identifies the relationship between the sequence 60 and sub-sequence 70 subdivided therefrom. Any individual sequence 60 or sub-sequence 70 may be a sub-sequence 70 or sequence 60, respectively, to another sequence 60 or sub-sequence 70.

For example, the sub-sequences 70a–70c may be combined and be fit by a single curve segment 78a or curve segment characterization 78a. (It is proper to speak of a curve or curve segment as the curve or image itself or as the characterized, mathematical notation, defining the image in any case.) Alternatively, each of the sub-sequences 70a–70c may be fitted individually by its own respective curve segment 76a–76c. Likewise, the individual curve segment 78b may represent the sub-sequences 70d–70e. Alternatively, two separate curve segments 76d, 76e may represent the sub-sequences 70d, 70e.

One may note that a curve segment 78c may fit previously fitted sub-sequences 70f, 70g with a single characterization 78c. This characterization 78c, or curve segment 78c may then be consolidated or fit, along with points from another, free sub-sequence 70h. All the sub-sequences 70f, 70g, 70h are represented by another single curve segment 82b.

In general, a curve segment 82 is not actually a consolidation of other curve segments 78. Rather, an individual curve segment 78, 82, 84 may represent or fit the sub-sequences 74 that could otherwise, previously, or alternatively, be fit by other curve segments 76, 78, 82, respectively.

However, regardless or which curve segments 76, 78, 82, 84 are used to represent individual sequences 60, or sub-sequences 70, the number of curve segments 80 or curve segment characterizations 80 required may depend upon some selection criterion 120 selected by a user. For example, a single curve segment 84 or curve segment characterization 84 may represent an entire sequence 60, such as the sequence 60a. The curve characterization 84, depending on the order of the curve segment 84, may fit the sequence 60a with a greater error, poorer fit, than do the two curve segments 82a, 82b. Thus, if each of the curve segments 80 represents the same form or order of polynomial or other representation, then more curve segments 78 will fit the sequence 60 by sub-sequences 70 more precisely, with lower error, better fit, than will a single curve segment 84.

In one embodiment of an apparatus and method in accordance with the invention, a curve segment 86, characterization 86 may reflect virtually any type of curve. For example, a Bézier curve 86a–86c may characterize or fit a respective sub-sequence 88a–88c. A Bézier type of curve 86, such as the curve segment 86a, is typically characterized by anchor points 89a, 89d, representing ends of the curve segment 86a, and two control points 89b, 89c reflecting the character of the curve segment 86a between the anchor points 89a, and 89d. Bézier curves are well established in the graphical arts. Thus, the curve segments 80 or curve segment characterizations 80 may, in one embodiment, be represented as Bézier curve segment characterizations 86.

A multi-curve object 90 may be created to contain one, several, or all of the curve segment characterizations 80 corresponding to a sequence 60. A multi-curve object 90 may be made up of numerous nodes 91, or node data structures 91 reflecting the curve segments 80 and their linking relationships.

For example, in one embodiment, a multi-curve object 90 may be created to have a selection key 92 and linking references (e.g. pointers) 94 for linking nodes 91 together. For example, each of the nodes 91a–91i may include references 94, such as the references 94a–94c linking to one or more other nodes 91 having a parent or child relationship thereto.

Figure 4:
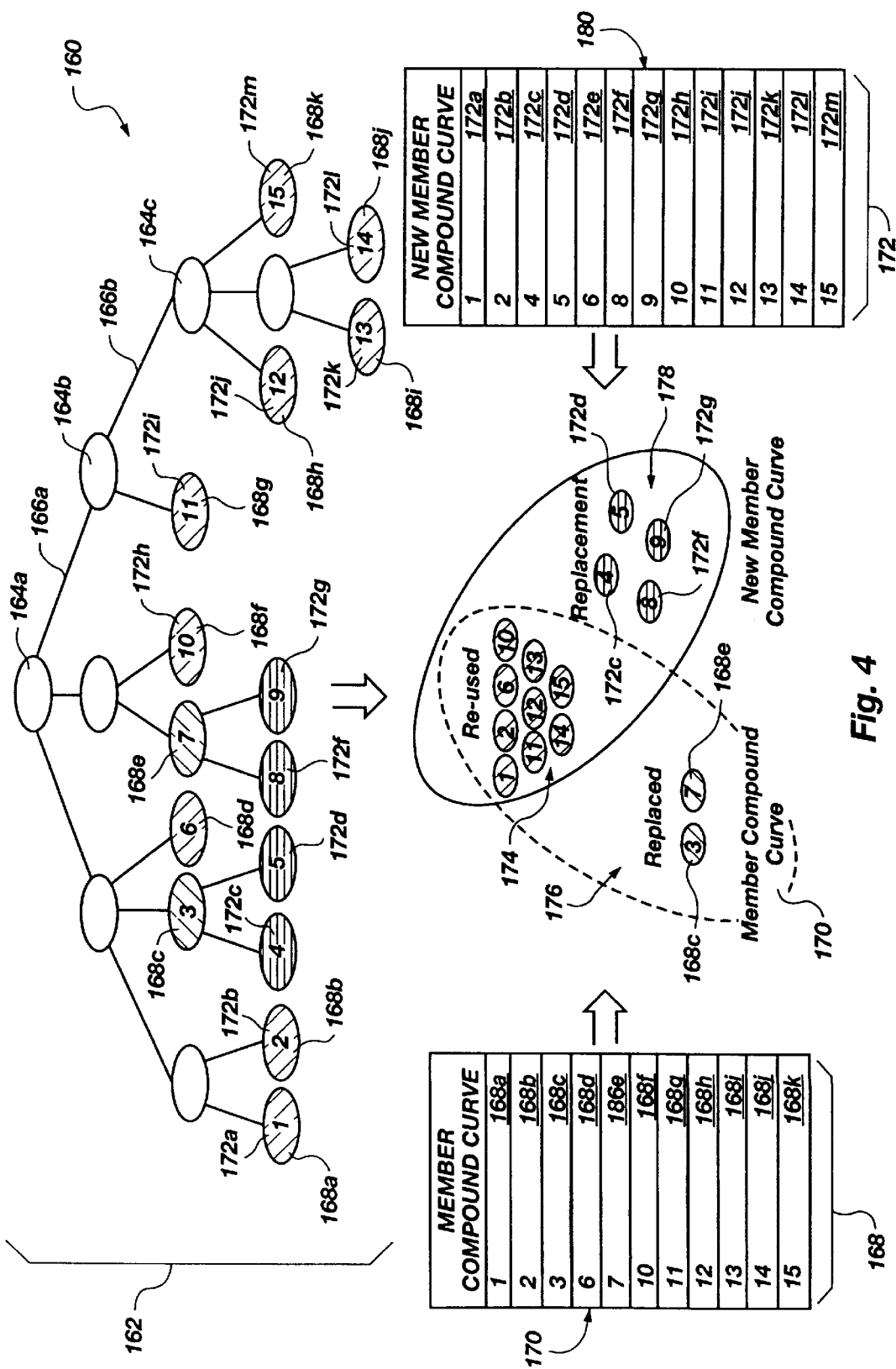
FIG. 4 is a schematic block diagram illustrating a graph configured as a tree of nodes corresponding to a sequence of points, in accordance with FIG. 3, to form two member compound curves meeting different selection criteria.
Figure 15:
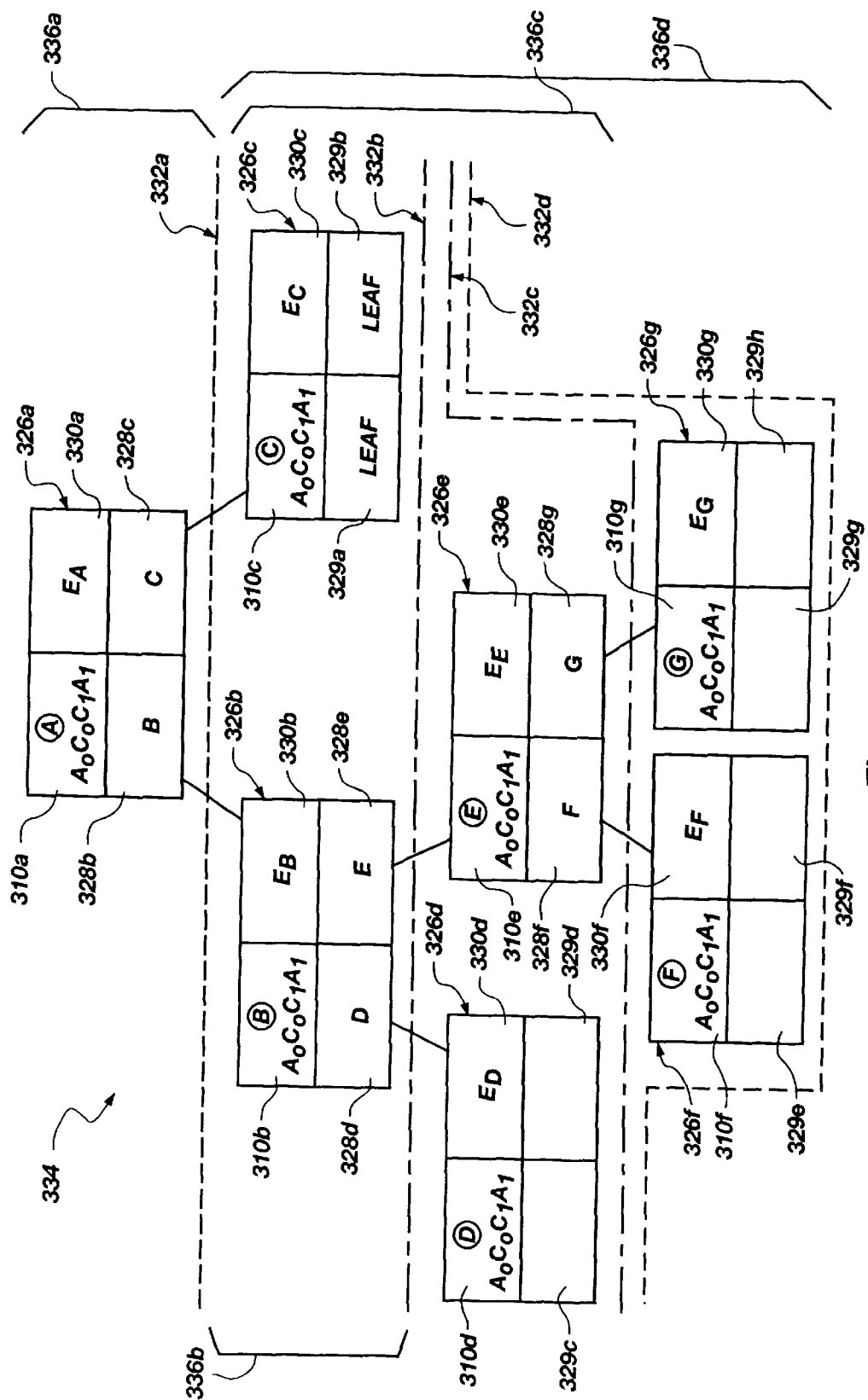
FIG. 15 is a schematic block diagram of a graph illustrating the multi-curve object of FIGS. 12–14, and representing the nodes and connections corresponding to various curve segments meeting different, selected, selection criteria.

Thus, the nodes 91, such as the nodes 91a–91i may be related in a hierarchical relation to one another, such as is illustrated in FIG. 4 and FIG. 15. Each of the linking references 94 may be implemented as a pointer 94 to a child node 91. The number of child nodes 91 related to a parent node 91 may be any practical number. In one embodiment, such as a binary tree, two pointers 94 may be associated with each node 91, and correspond to other child nodes 91 related thereto. In another, alternative, embodiment, pointers 94 may refer to a parent node 91 in question, as related as a child node.

In one embodiment, a multi-curve object 90 may include a lock 96 or lock data structure 96 associated with each node 91. A lock data structure 96 may include several lock parameters 98. For example, a root identifier 98a may identify a root node 91 below which a multi-curve object 90 is not to be extended, rendered, altered, or the like. Similarly, any attribute 98b, in general, may be associated with a lock data structure 96 of a node 91. For example, a subdivide flag 98c may indicate that a particular node 100, or rather a curve segment characterization 80 of a node 100, is not to be further subdivided into different curve segments 80. As explained above, curve segments 80 are not subdivided, typically, but rather the sub-sequences 70 are subdivided into different sub-sequences to be fitted with other curve segments 80.

An error bound 98d or simply an error 98d may be included in a lock data structure 96 within a node data structure 91 for several purposes. For example, a user may desire to include an error 98d, above or below, which no selection key 92 is deemed desirable, selectable, or the like.

Thus, a lock data structure 96 may be used to lock certain nodes 91 into relationships, or out of representations of a multi-curve object 90. That is, a multi-curve object 90 may be represented by several types of curve segments 80. An attribute 98b may indicate a type of curve segment (characterization) 80 that may be used. A curve segment characterization 80 may be triggered by a particular attribute 98b. A lock 96 may speed rendering and un-rendering of different curve segments 76, 78, 82, 84 representing a multi-curve object 90 corresponding to a sequence 60. A lock 96, or lock data structure 96 may circumvent or obviate changes, inclusion of nodes 91, traversing of nodes 91. Locking may simplify calculation, stabilize changes, eliminate redundancy or unnecessary precision, or the like, in representing a multi-curve object 90.

A node 100, representing the node data structure 100 for each of the nodes 91 in a multi-curve object 90 may include a node identifier 101 or node ID 101. One may note that the relationships between the nodes 91, whether contained in the node ID 101 and the linking references 94 or whether contained in a separate binding table containing the node ID 101 and the linking references 94, are simply different representations or implementations of the same nodes 91, 100 of a multi-curve object 90 responding to a sequence 60 of points 62.

Referring still to FIG. 2, other data structures 102–136 may be stored in a memory device 14, such as the RAM 20. Certain of the data structures may be executable, while others are merely operating data to be used by an executable operating on a processor 12.

In one embodiment, an interaction executable 102 may be embodied in one or more modules to provide for user interaction. In general, a user may be another device such as another node 52 in a network 30. For example, an input module 104a and an output module 104b may provide for inputs and outputs, respectively, of a user interacting with the multi-curve object 90. Similarly, the interaction executable 102 may include executable modules for providing and for managing the sequences 60, multi-curve objects 90, and the like.

Multi-curve creation executable 106 may be responsible for building one or more desired multi-curve objects 90. The module 106 or multi-curve creation executable 106 may include a recursion module 108, an iteration module 109, or both 108, 109. A multi-curve object 90 may be created by recursion 108 in an efficient manner. However, typically, a recursive process 108 may often be implemented by an iteration process 109. Since each creation module 108, 109 may have advantages in any particular situation, both modules 108, 109 may be provided as alternatives. In an alternative embodiment, the modules 108, 109 may provide certain optimized capability by being applied to specific circumstances determined by a user or by the controlling functions of the multi-curve creation executable 106.

After a multi-curve object 90 is created, it may be used for several purposes. In one embodiment, a multi-curve object 90 may be used to control, predict, or otherwise affect some other device operably connected to a computer 11. In one embodiment, a multi-curve object 90 may be useful for representing an image comprised of curves composed of other curve segments 80. For example, the compound curve executable 110 may include a composition module 112 for composing a member compound curve 130 representing a multi-curve object 90. One may note that an individual member compound curve 130 may include some selected group of curve segments 76, 78, 82, 84, for representing an image of a multi-curve object 90 in accordance with some selection criterion 120 applied.

A rendering/un-rendering module 114 may provide for rendering on an output device 24 an image corresponding to a member compound curve 130 made up of curve segments 80 or curve segment characterizations 80 from selected nodes 91, 100. For efficient rendering and un-rendering of an image on an output device 24, the rendering/un-rendering module 114 may operate to render or un-render, as required, any individual curve segment 80 of a member compound curve 130. In one embodiment, a modification module 116, may control the engagement and use of the rendering/un-rendering module 114.

The composition module 112 may share many features in common with the rendering/un-rendering module 114 or the modification module 116. In general, however, composition of a member compound curve 130 need not result in rendering an image. As mentioned, composition of a member compound curve 130 may simply provide a control surface, control curve, control characteristic, or the like for some remote computer 52 of a network 30 to which the computer 11 is operably connected.

Curve segments 80, or nodes 91, 100 associated with curve segment characterizations 80, may be selected or included in a member compound curve 130 according to certain selection data 118 provided. Selection data 118 may include a selection criterion 120. A selection criterion 120, in general, may correspond to the nature and the values of the selection keys 92 of the various nodes 91, 100. Note that the node 100 represents a prototype for any of the nodes 91, and thus, in general, a node 100 may be referenced as containing any or all of the data structure 100 illustrated in FIG. 2.

In general, a selection criterion 120 may be a variable or token of virtually any type. However, as a practical matter, for curve segments 80, a selection key 92 may typically reflect an error of fit of a curve segment 80 to a particular sub-sequence 70 of a sequence 60. Thus, a selection criterion 120 may be a maximum permissible error. Thus, a member compound curve may be created as a hierarchy 130 of nodes 100 whose selection key values 92 meet the selection criterion 120. For example, a node 100 corresponding to a selection key 92 may be satisfactory if the selection key 92 reflects an error less than some error criterion 120. However, in much graphics work, color, intensity, and a host of other factors may be significant in a multi-curve object 90. Accordingly, a selection criterion 120 may be any type of data that may be corresponded with a selection key 92 in order to determine whether or not a node 100 is to be included or excluded from a particular member compound curve 130 used to represent a multi-curve object 90. Thus, a multi-curve object 90 will include all of the nodes 100 that might possibly be needed, while a member compound curve 130 will include only those nodes 100 and have been selected for a particular representation of a multi-curve object 90.

Multiple selection criteria 122 may be provided in the selection data 118. For example, a minimum error and a maximum error may both be provided as individual criteria 122 for filtering nodes 100 to compose a member compound curve 130. To the end of selecting nodes 100 to be included in a member compound curve 130, a selection executable 124 may be provided to compare the selection keys 92 against an individual criterion 120 or multiple criteria 122. A host of comparative techniques exist for implementation in a selection executable 124. All mathematics, whether arithmetic, Boolean, including all of predicate calculus with its operators of arithmetic, logical, comparitor, and aggregator types, and the like may be employed in a selection executable 124 for effecting selection of nodes 100 for inclusion in a multi-compound curve 130.

Modification need not, in one embodiment according to the invention, be so extensive as an original creation of a member compound curve 130. A selection modification executable 126 may be provided. The selection modification executable 126 may be programmed to optimize changes to a selection of nodes 100 in a member compound curve 130 in order to provide a new member compound curve 131.

It is advantageous, and implemented in one embodiment of an apparatus and method in accordance with the invention, to leave unaffected a re-used portion 132 of a member compound curve 130. The selection modification executable 126 is effective to identify a replaced portion 134 of a member compound curve 130. Thus, in alternative embodiments, the re-used portion 132 may be unaltered. The re-used portion 132 need not be identified. Rather, if the selection modification executable 126 merely identifies a replaced portion 134 of a member compound curve 130, the re-used portion 132 may be left unaffected.

Thus, for the new member compound curve 131 resulting from changing a selection criterion 120 to modify a member compound curve 130, not all nodes 100 in the member compound curve 130 are affected. That is, any selection key 92 may meet several different selection criteria 22 or a changing selection criterion 120 provided by a user. Accordingly, if a selection key 92 meets both a previous selection criterion 120 and a later or subsequent (e.g. either more or less restrictive) selection criterion 120, then the node 100 corresponding to that selection key 92 may be included in both a member compound curve 130 and a subsequent new member compound curve 131. A curve segment 80 corresponding to a node 100 that is included in both a member compound curve 100 and a new member compound curve 131, becomes part of a re-used portion 132.

By contrast, any node 100 whose selection key 92 meets a previous selection criterion 120, but fails to meet a new selection criterion 120, will be part of a replaced portion 134. The replaced portion 134 is part of the member compound curve 130, but is not part of a new member compound curve 131, in accordance with the new selection criterion 120. Similarly, any node 100, whose selection key 92 does not meet some previous selection criterion 120 used by a selection executable 124 in creating a member compound curve 130, but does meet the selection criterion 120 used by a selection modification executable 126 in creating a new member compound curve 131, will be part of a replacement portion 136.

Thus, a rendering/un-rendering module 114 in conjunction with, such as under the control of, a modification module 116, may attend to the un-rendering of the replaced portion 134 and the rendering of the replacement portion 136. The entire member compound curve 130 is not un-rendered, and the entire new member compound curve 131 is not rendered, at least not individually as such entities. Rather, only those curve segments 80 that are in the replaced portion 134 are un-rendered; only those curve segments 80 that are in the replacement portion 136 are newly rendered with a change of a selection criterion 120 by the selection modification executable 126.

Figure 3:
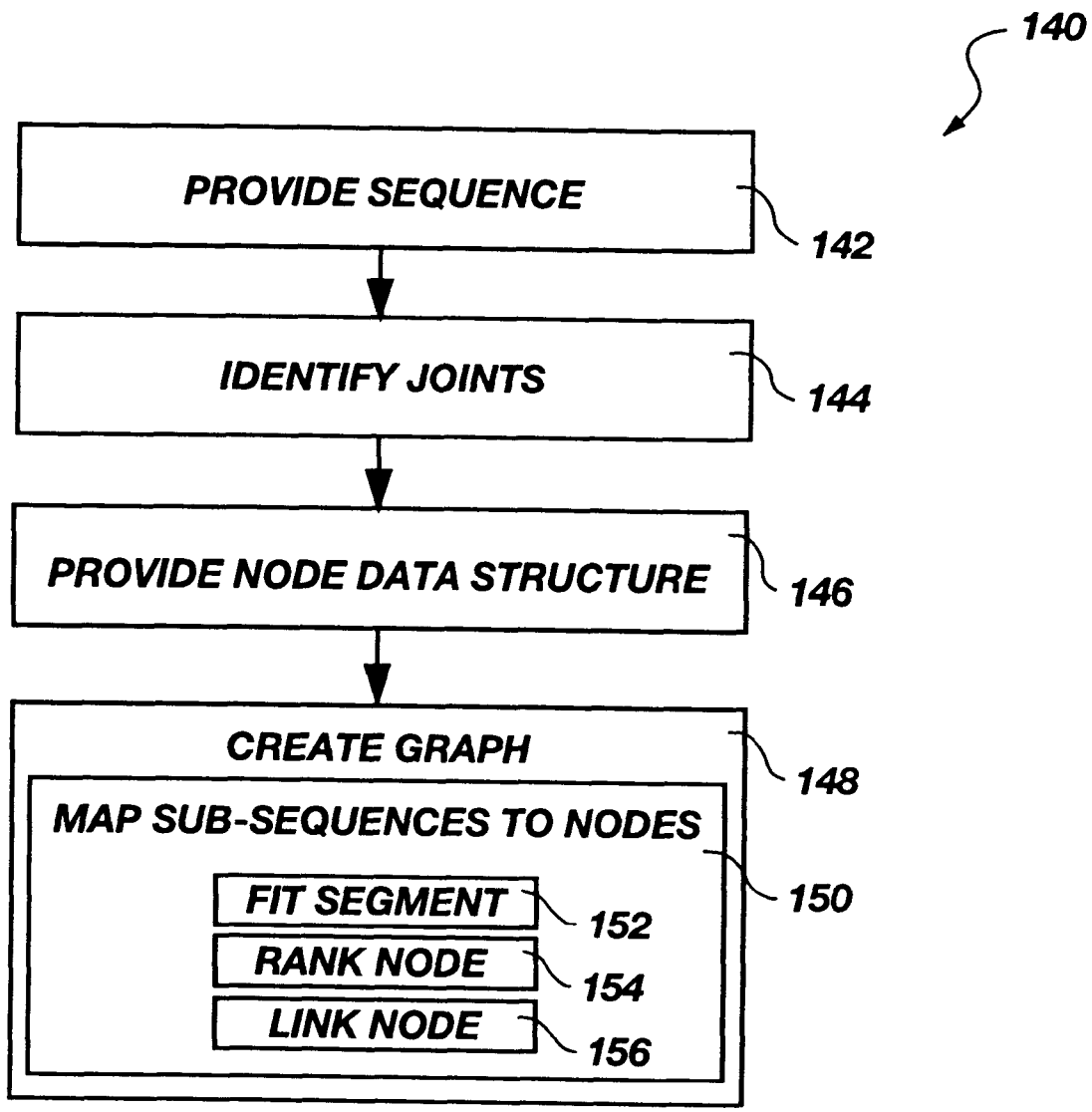
FIG. 3 is a schematic block diagram of a process for creating a graph as a multi-curve object.

FIGS. 3–21 illustrate certain implementation details, examples, and various embodiments of features discussed more abstractly with respect to FIG. 2. FIG. 3 may be thought of as illustrating the creation process 140 for a multi-curve object 90 while FIG. 4 illustrates an example of a multi-curve object 90 (graph 160) represented by different member compound curves 130 (e.g. curves 170, 180), with re-used and replacement of nodes. FIGS. 5–11 illustrate various executables for implementing recursive and iterative creation of multi-curve objects. Various recursive rendering and modification, including un-rendering, of member compound curves 130 are illustrated, corresponding to a multi-curve object 90.

Referring now to FIG. 3, a creation process 140a begins with a sequence step 142 or a provide sequence step 142. The provide sequence step 142 may be done by a user directly through an input device 22, or may be provided to a processor 12 by any other suitable means. A provide sequence step 142 corresponds to providing a sequence 60 of points 62 in some domain.

An identify step 144 or identify joints step 144 may be automatic or manual. Joints 74 correspond to points 62 in the sequence 60 at which sub-sequences 70 may terminate. The identify joints 144 or identify joints step 144 may be responsible to provide a data structure relating the joints 74 to the sequence 60 and the sub-sequences 70. In general, joints 74 may be points 62 from a sequence 60 that have been selected because they represent a significant change, such as a corner or other sharp transition in an image or between two curve segments 80. Alternatively, joint 74 may merely represent some spatial division point 62 along a sequence 60. For example, a midpoint may be selected as a joint 74. However, in general, the identification of joints, including the identify joints step 144 may be done all at once, in advance, or only as needed during creation of the multi-curve object 90.

The provide node data structure step 146 (also referred to as a provide node step 146, and the like) may be responsible to select, create, or the like, the node data structure 100. In one embodiment, the provide node step 146 may involve selection of a format for the nodes 100.

The provide node step 146 establishes a data structure 100 that will be used to represent a multi-curve object 90. The create graph 148 or create graph step 148 is responsible to identify individual sub-sequences 70, produce curve segments 80 fitted thereto, and link nodes corresponding to curve segments 80 to create a graph of nodes 100. A map sub-sequences to nodes step 150, or simply a map step 150 may be responsible to create and store representations of the sub-sequences 70 and the corresponding curve segments 80 in the node 100. Likewise, the remainder of the data structure 100 may be filled by the map step 150.

In one embodiment, a fit segment step 152 or module 152, may fit a particular sub-sequence 70 with a curve segment 80. In one currently preferred embodiment, the fit segment step 152 may begin with a single curve segment 84 characterizing the entire sequence 60. The fit segment step 152 may continue by subdividing the sequence 60 into individual sub-sequences 70, fitting each with a curve segment characterization 82, 78, 76, respectively, as needed.

A rank node step 154 and a link node step 156 may be made in virtually any order with respect to each other and the fit segment step 152. In one presently preferred embodiment, a process of subdividing the sequence 60 in to sub-sequences 70 by fitting the entire sequence 60 with a single curve segment characterization 84, subdividing at a joint 74 interior to (e.g. for example, near the middle of) the sequence 60, and continuing to so subdivide, may provide a natural rank 154 and link 156 as well as a fit 152. Thus, each node 100, as it is provided with a curve segment characterization 80, a selection key 92 based on an error of the fit 152 of the curve segment 80 to its respective sub-sequence 70, provides a rank step 154.

Similarly, the process of subdividing the sequence 60 into sub-sequences 70 provides a nearly automatic rank step 154. Moreover, the link step 156 may result naturally and implicitly in such a subdivision process. For example, each node 100 may be provided with linking references 94, such as pointers to subsequent nodes 100, whose curve segments 80 reflect subdivision of a sub-sequence 70 corresponding to a parent node 100. In one embodiment, a binary tree may be created in which every node 100 contains two pointers 94 to child nodes, and each curve segment characterization 80 of a child node 100 contains a selection key 92 reflecting an improved error over the curve segment characterization 80 of parent node 100.

Referring now to FIG. 4, a multi-curve object 160 may represent one embodiment of the multi-curve object 90 (see FIG. 2). The multi-curve object 160 may be thought of as a graph and, as illustrated, reflects a tree. The tree 160 may be a binary tree, but, is not so as illustrated. In fact, as illustrated, not all nodes need have the same number of child nodes associated.

The multi-curve object 160 is made up of nodes 162. The nodes 162 are ranked and linked. For example, a node 164a is linked by an edge 166a to a child node 164b. The child node 164b is a parent node 164b with respect to a child node 164c linked by an edge 166b. One may think of the edges 166a, 166b as being embodied in the linking references 94 or pointers 94 in each node 100. Thus, each of the nodes 164 includes linking references 94 to effect the edges 166 or links 166 to child nodes 164. One may speak of the node 164a as a root node for all nodes 162 (e.g. 164b, 164c) descending therefrom. Similarly, the node 164b is a parent, and a root node for all nodes 162, descended therefrom (e.g. node 164c).

The multi-curve object 160 may be represented by selected nodes 168 selected by a selection executable 124 to be included in a member compound curve 170. In the illustration of FIG. 4, each of the nodes 168 (nodes 168a–168k) contains a respective selection key 92 that meets a selection criterion 120. Accordingly, the member compound curve 170 reflects a curve that illustrates, represents, or reflects the multi-curve object 160 at, for example, an error level corresponding to a selection criterion 120, met by each of the selection keys 92 of the nodes 168.

By changing the selection criterion 120, nodes 172 may be selected to represent the multi-curve object 160. Many of the nodes 172 are the same as certain of the nodes 168. Likewise, the nodes 172a–172m are greater in number, reflecting, for example, a smaller tolerable error reflected in a selection criterion 120 which each of the selection keys 92 of the nodes 172 must meet.

Thus, the member compound curve 170 includes certain re-used nodes 174 shared with the new member compound curve 180. Meanwhile, the replaced nodes 176 may be deleted from the member compound curve 170 in order to form the new member compound curve 180. Similarly, the replaced nodes 176 are replaced by the replacement nodes 178. The replacement nodes 178 reflect, for example, selection key values 92 that meet a more restrictive error criterion (selection criterion 120) required of the new member compound curve 180, as compared with the member compound curve 170 originally selected.

Similarly, if, in this example, the selection 92 reflects an error of fit of each curve segment 80 to some appropriate sub-sequence 70, then the replaced nodes 176 have error values 92 or selection key values 92 that exceed some permissible error level 120 used as a selection criterion 120.

Meanwhile, each of the re-used nodes 174, in this example, assuming that the selection key 92 is used to reflect an error, has an error value 92 that meets the error criterion 120 selected for the member compound curve 170, as well as the selection criterion 120 selected for the new member compound curve 180. Accordingly, if the curve segments 80 corresponding to the nodes 172 of the new member compound curve 180 are to be rendered, replaced nodes 176 need to be un-rendered, and only the replacement nodes 178 need to be newly rendered. In complex graphical objects, the re-used nodes 174 may constitute a substantial portion of any representation of a multi-curve object 160. Accordingly, a user need not be delayed, or processing need not be delayed by unnecessary un-rendering and re-rendering of the re-used nodes 174.

Figure 5:
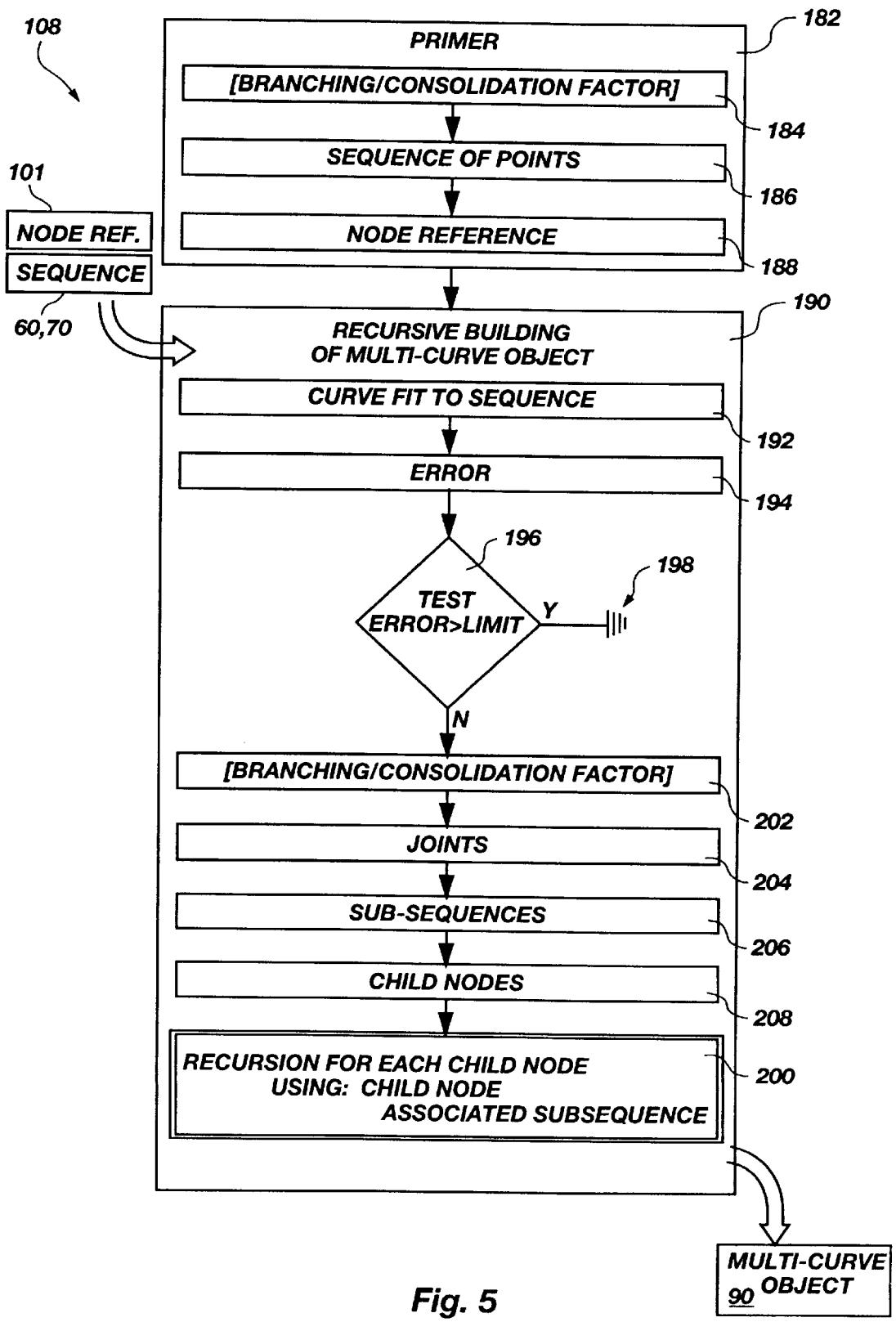
FIG. 5 is a schematic block diagram of a process for recursive building of a multi-curve object.

Referring now to FIG. 5, and generally to FIGS. 5–11, a recursion executable 108 may include, or be preceded by a primer 182. In general, a recursion process 108 needs to have certain parameters, such as a branching factor 184 or consolidation factor 184 identifying how many child nodes 100 may be allowed to be referenced or linked to a particular parent node 100. Thus, the number of linking references 94 in a node 100 may be specified by a branching factor or a consolidation factor 184. However, the branching/consolidation factor 184 is optional. A value may be provided by default. The branching/consolidation factor 184 may vary between different nodes in a hierarchy in a graph 160, for example.

A sequence step 186 or sequence of points 186 may provide the sequence 60 to be represented by a multi-curve object 90. A node reference 188 step may provide a root node 100, (e.g. such as the root node 164a in FIG. 4) at which the recursion process 108 is to begin. In general, any recursion process may be thought of as a nested process.

In general, a node reference 101 and a sequence 60, 70 may be provided, recognizing that mathematically, a sequence 60 and a sub-sequence 70 may both be treated as sequences. Thus, a primer 182 may set up certain data as necessary to support the recursive building 190 of a multi-curve object 90 (e.g. "prime the pump"). In subsequent recursion 200 the recursive building 190 continues. The node reference 101, and sequence 60, as recursion progresses are not those originally provided by the primer 182.

One may note that the illustration of steps 184–200 may also be thought of as illustrating corresponding data structure. Thus, the branching/consolidation factor 184 may be thought of as step 184 for providing or determining such a factor. The branching/consolidation factor 184 may also be thought of as a data structure representing (such a factor 184. Similarly, a sequence 186 may reflect a sequence 186 (e.g. such as original sequence 60), and a node reference 188, may reference a node identifier 101 for a node 100.

The recursive building module 190 or step 190 may include a curve fit to sequence 192. The curve fit 192 may provide any suitable method implemented to fit a curve segment 80 to a sequence 60, 186 provided to the recursive building module 190. A consequence of the curve fit 192 is an error 194. The error 194 may be calculated by any suitable means of which many are known in the art. The error 194 may be thought of as a step 194 providing an error value 194 to be stored as a selection key 92 corresponding to a curve segment 80 in a node 100. Thus, the node reference 188, 101 provided to the recursive building module 190 is provided an error 194 by an error step 194, to be stored as the selection key 92.

A test 196 may determine whether an error 194 meets a limit, such as a selection criterion 120. If so, then the curve fit 192 has satisfied the selection criterion 120. Thus, the module 120 may go to ground 198. That is, that "instantiation" or "branch" of the recursive building process 190 may stop. No subdivision of the provided sequence 60, 70, 186 needs to be made. The curve fit 192 is adequate to meet the entire provided sequence 60, 70, 186 with an error 194 satisfying the selection criterion 120 applied by the test 196.

If the error 194 is greater than the selection criterion 120, then subdivision may occur. If a branching/consolidation factor 184 has been provided, it may be provided 202 as an option. Thus, some subdivision number may be provided 202 to determine how many subdivisions each be sequence 60, 70, 186 should have. In certain embodiments, the branching/consolidation factor 202 may be dependent on several options including some programmed formula of the recursive building process 190. Accordingly, the branching/consolidation factor step 202 may be implemented as a determination of the branching/consolidation factor to be used.

Whether by calculation, default, input, or whatever source, a branching/consolidation factor 202 provides that the sequence 60, 70, 186 in question, will be subdivided at joints 204. The joints step 204 may be thought of as identifying joints in the sequence 60, 70, 186. Divided at the joints 204, a set of sub-sequences 206 is provided. That is, a sub-sequences step 206 may provide sub-sequences 206 representing the subdivision of a sequence 60, 70, 186 at the joints 204. Realizing that each element of FIG. 5 may reflect both a step for providing certain data, as well as the data structure provided, the sub-sequences 206 will replace the sequence 60, 70, 186 originally provided to the recursive building process 190.

Accordingly, a child node step 208 may provide child nodes 208. That is, node data structures 100 may be set up and filled to the extent possible. This may occur, in one embodiment, by creating in a memory device 14 the data structure 100. Assigning a node ID 101 and providing the linking references 94 in a parent node 100 provides linking. A node 100 identified by the node reference 101 may be fed 8 into the recursive building process 190 with the data structure 100 for each of the child nodes 208. The child nodes step 208 is followed by a recursion step 200, providing recursion equivalent to the process 190 for each of the child nodes 208.

Accordingly, a reference to each of the child nodes 208 may be fed back into the recursive building process 190 as the node reference 101 in the next instance of recursion 190. An associated sub-sequence 206 may be provided as the sequence 60, 70 fed to the recursive building process 190. Thus, the recursion step 200 is illustrated with a double box pointing out that the recursion 200 represents another instance or recursion of the recursive building process 190. The recursion 200 may be nested at many levels to create a multi-curve object 90.

One may note that the recursion 200 may continue subdividing a sequence 60 (e.g. sequence 60, sub-sequence 70, or provided sequence of points 186) until the test 196 indicates that the selection criterion 120 has been met by the error 194. In many instances, as known in the art of numerical methods, a sub-sequence 70 may be fit perfectly, or interpolated perfectly by a curve fit 192.

Figure 6:
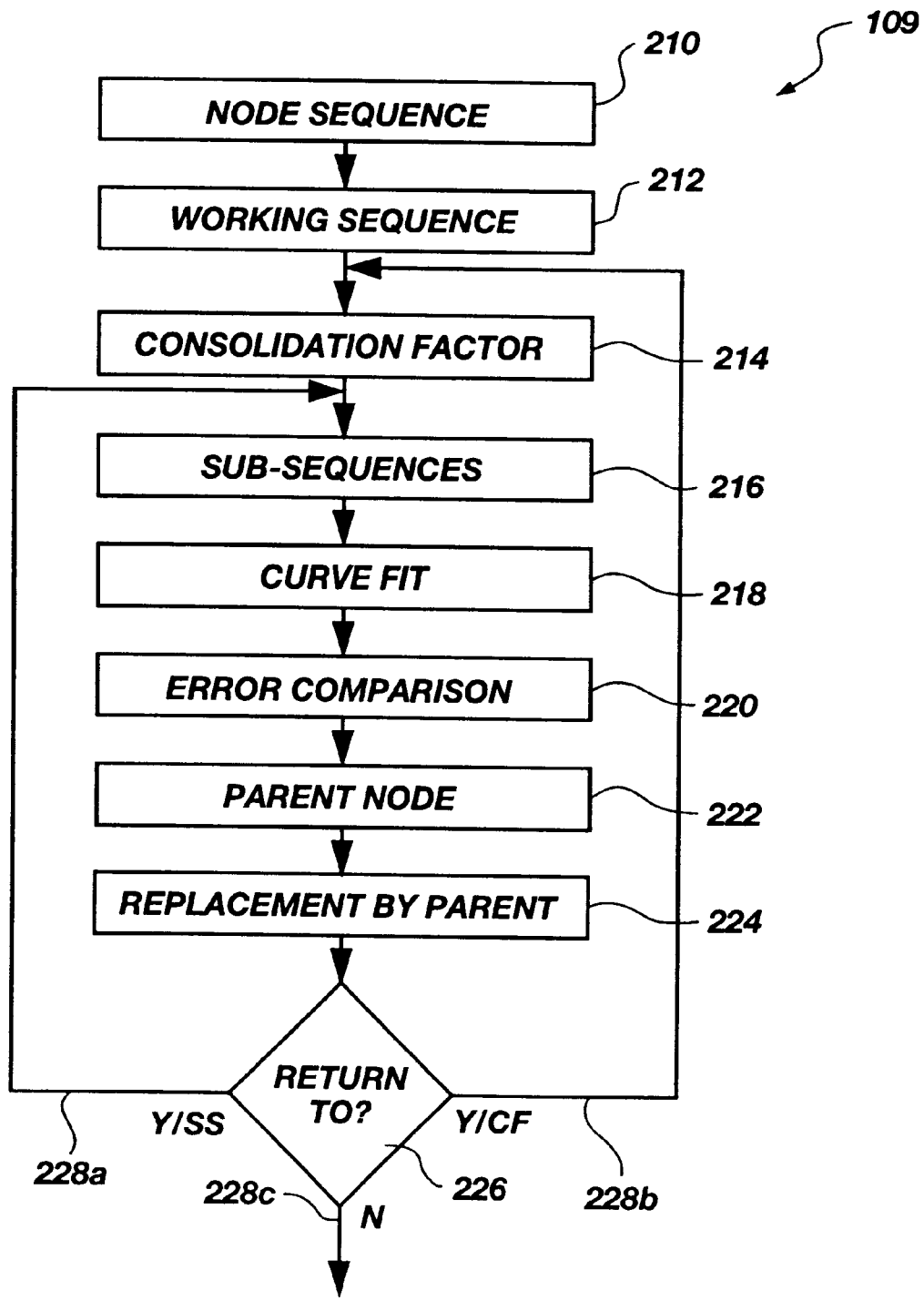
FIG. 6 is a schematic block diagram of an iterative approach to creation of a multi-curve object.

Referring now to FIG. 6, an iteration module 109, or iteration process 109, may be used instead of a recursive or recursion process 108. This may be thought of as a bottom-up process and recursion as top-down. In one embodiment of an iteration process 109, a node sequence 210 may be provided. A node sequence 210 may be thought of as a sequence of nodes 100 corresponding to sub-sequences 70, subdivisions of a sequence 60 to some maximum allowed extent of subdivision. The maximum allowed extent may be selected by a user, determined programmatically, or determined by some other criterion. Thus, the node sequence step 210 provides a node sequence 210 reflecting a maximum degree or level of subdivision of a sequence 60 into sub-sequences 70.

A working sequence step 212 may provide a working sequence 212. Thus, a working sequence 212 contains some number of sub-sequences 70.

A consolidation factor step 214 may decide, determine, choose, or otherwise provide a consolidation factor 214. Thus, the consolidation factor 214 is similar to a branching factor 184. That is, the number of linking references 94 that will exist in a node 100 may be provided as a consolidation factor 214.

The iteration process 109 may begin from the bottom of the tree and progress upward. In thus creating a multi-curve object 90, some method for consolidation must be determined, just as some branching of child nodes must be determined in the recursion process 108. For example, a consolidation factor 214 of two may indicate that two rodes 100 will be consolidated into (fit by a single curve segment in) one parent. Alternately, three or more nodes 100 may be consolidated into (have their sub-sequences fit by) a single parent node 100.

In one embodiment, a consolidation factor step 214 may provide a calculation, formula, error-based preliminary calculation, or other mechanism for providing a consolidation factor 214. Regardless of whether error is increased, nodes may be beneficially consolidated until a single node 100 corresponds to an entire sequence 60.

Likewise, so long as error is not increased, consolidated nodes 100 can suffice for inclusion in a member compound curve 130. In one example, the straight line may be reflected by a sequence 60 of many points 62. However, any two points 62 from the sequence 60 may be used to represent a line. Accordingly, no other consolidation is nearly so efficient as consolidating all of the points that will fit on a straight line into a single node.

A consolidation factor 214 need not be based not on a single number, but may depend on some criterion such as an error of fit. However, in one embodiment, the consolidation factor 214 may be determined in advance as a single number such as two, representing a binary tree, three representing a tertiary tree, and the like.

The consolidation factor 214 may be used in a sub-sequences step 216 to provide individual sub-sequences 216 from the working sequence 212. The sub-sequences 216 are then fit 218 by curve fit step 218 to provide curve segments 218. The data structure of the curve segments 21.8 may be provided by a process 218. Accordingly, nodes 100 may be provided with a curve segment characterizations 80 by the step 218., Associated with each curve fit step 218 (actually each segment 218 fit in step 218) is an error such as that reflected by the selection key 92 in the generic node 100 of FIG. 2. Accordingly, an error comparison 220 may test to determine whether or not an error 92 of a selection key 92 meets some selection criterion 120. The error comparison step 220 may be embodied in an alternative approach. For example, all of the individual sub-sequences 216 with their respective curve fits 218 may be compared to find the very best one of the curve fits 218 having the least error 92.

The group of nodes 100 for the best-fit sub-sequence 216 may be combined 222 by a parent node step 222. That is, a parent node 222 may be created by a parent node executable 222, or parent node module 222, that represents all of the sub-sequences 216 with a curve segment characterization 80 that best fits or meets some other criterion for consolidation.

The parent node step 222 provides a parent node 222 that will replace some sub-sequence 216 in a working sequence 212. Thus, a replacement step 224 reflects some executable programmed to create a new working sequence 212. The new working sequence 212 from the replacement step 224 may be followed as a replacement sequence 224 or a replacement working sequence 224. Regardless of terminology, a new working sequence 212 is now prepared for iteration.

A test 226 may determine whether or not some criterion has been met. A criterion, such as a selection criterion 120, may determine that an error criterion has been met, that all nodes have been consolidated to a single node, or that some other criterion 120 has been met. Accordingly, once an iteration criterion 120 has been met, the test 226 will reflect a negative result 228c indicating completion of the creation process 106 by the iteration module 109. Alternatively, iteration may continue by a positive response 228b indicating that a new consolidation factor 214 is to be created. If a consolidation factor 214 is provided by some process 214 that is not based on a fixed number, then the consolidation factor step 214 may be repeated. Alternatively, some scheme may be present that alters the consolidation factor 214 from one iteration to another. Otherwise, a consolidation factor 214 may be set once and the process of setting it may not be repeated for any subsequent iteration.

In one embodiment, a user may determine, or the program implementing the iteration module 109 may determine that a set of nodes 100 in a working sequence 212 are to be consolidated. In one presently preferred embodiment, the replacement step 224 merely replaces the set of nodes 100 in the working sequence 212 with a parent node 222. Thus, the replacement step 224 provides a new working sequence 212. The sub-sequences step 216 provides a new set of sub-sequences of nodes to be fit. The parent node 222 reflects or represents a larger sub-sequence 70 made up of the contents of the sub-sequence originally represented by the consolidated child nodes 100.

The iterative process 109 performs a curve fit 218 and error comparison 220. Iterative process 109 replaces nodes 100 or consolidated sub-sequences 216 by their parent nodes 222. It fits the best curve segment 218 to several sub-sequences 216 having the best error comparison 220. The parent node 222 replaces the consolidated child nodes 100, 218 in the working sequence 212 and the iteration 109 and proceeds. Eventually, the iteration process 109 may result in a single node sequence 212 containing a single node 100, that may not be consolidated further. Such a single node 100 in a sequence 213 may correspond to the starting point of a top-down recursion process 108 in producing a single, initial curve segment 84 (see FIG. 2).

Figure 7:
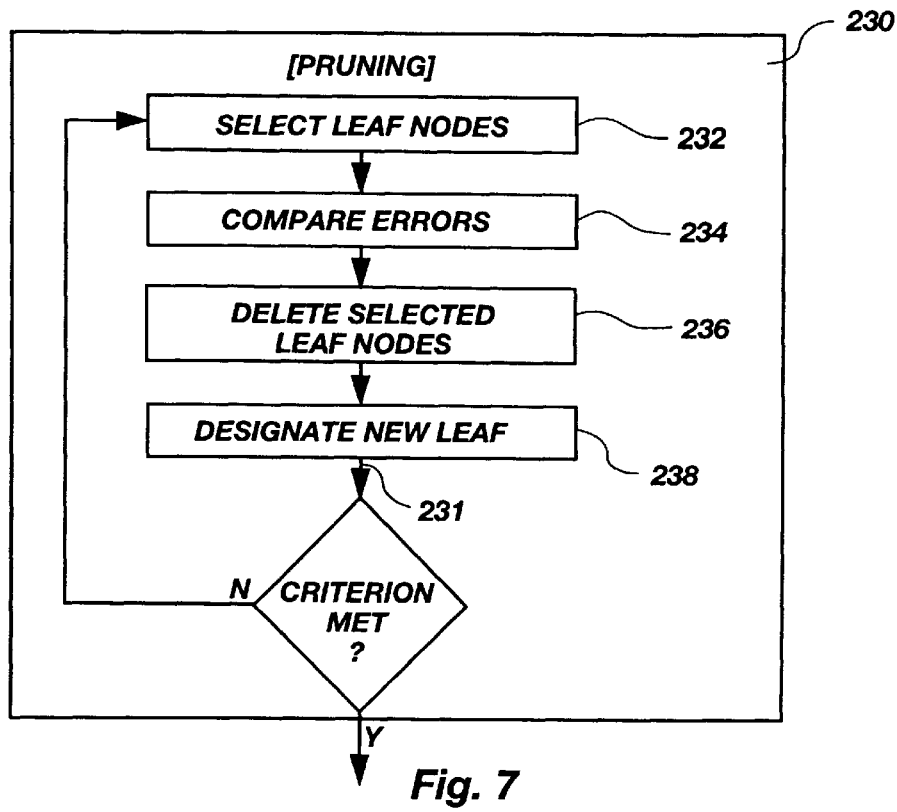
FIG. 7 is a schematic block diagram of an optional pruning method for reducing the number of nodes is a multi-curve object, such as may result from the processes of FIG. 5 or FIG. 6.

Referring now to FIG. 7, the pruning process 230 is optional. For several reasons including saving storage capacity, reducing processing, and the like, a multi-curve object 90 may be pruned 230. However, it may be productive especially when changes in respective errors are minimal or non-existent, to replace all nodes below an interior node having some satisfactory error, with the interior node itself. Thus, a select leaf nodes step 232, in conjunction with an interior node, may determine a sub-tree for comparison.

A compare errors 234 may compare the errors of each of the respective leaf nodes 232. According to some criterion 120 provided by a user, a delete selected leaf nodes step 236 may delete any leaf nodes 232 whose error provides insufficient improvement. That is, any leaf node 100 having no appreciable improved error as compared to a parent node 100, may be deleted from a graph 160, or multi-curve object 90.

Accordingly, a parent node (e.g. node 168e, with respect to nodes 172f, 172g) may be selected as a new leaf node 238 replacing the previously selected leaf nodes 232 (e.g. 172f, 172g, in FIG. 4) if the deleted leaf nodes 236 have no appreciable improvement of error over the designated new leaf 238 which was formerly a parent node (e.g. 168e). When a test 231 determines that some criterion for pruning 230 has been met, the process 230 may terminate. The pruning process 230 thus provides for eliminating manipulation of additional data (node data structures 100) with their attendant processing when to do so would provide no appreciable additional advantage in terms of accuracy, smoothness, precision, or other selection criterion 120 provided by a user.

Figure 8:
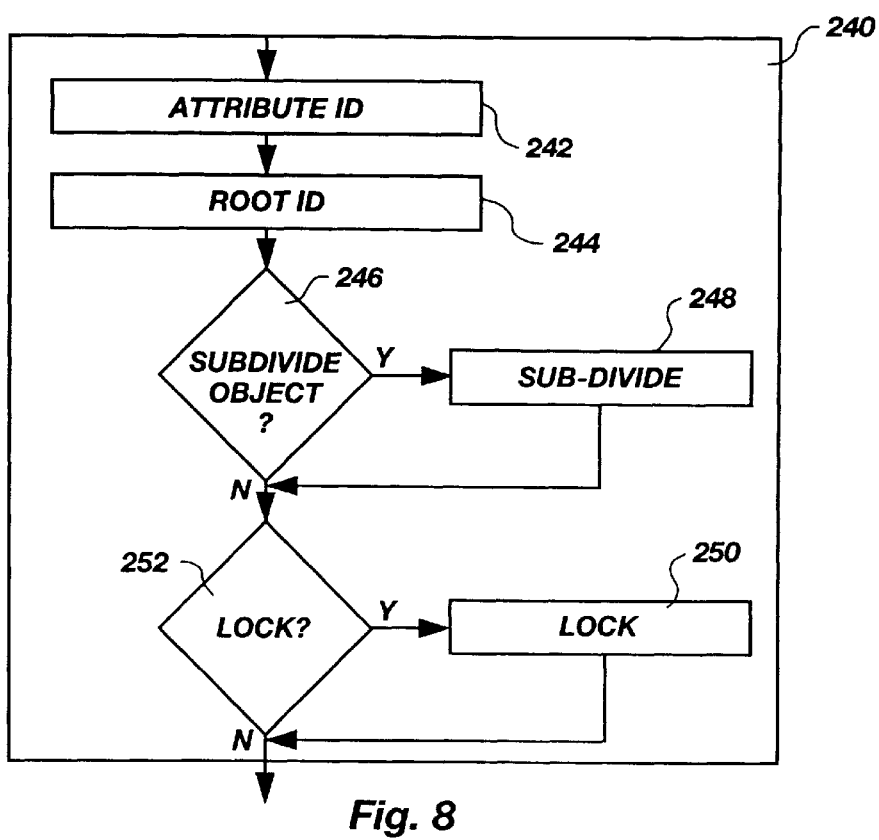
FIG. 8 is a schematic block diagram of one embodiment of a process for engaging a locking mechanism for locking nodes of a graph or other multi-curve object in accordance with the invention.

Referring now to FIG. 8, a lock process 240 may be provided to stabilize a part or all of a multi-curve object 90. In one embodiment, an attribute ID 242 may be provided. The attribute ID 242 may reflect a criterion or attribute 98b associated with a node data structure 100. For example, an attribute ID 242 may identify a particular attribute that is desirable in a node data structure 100. Accordingly, all nodes 100 having an attribute value 98b corresponding to the attribute ID 242 may be selected for inclusion or exclusion from the multi-curve object 90, or from a member compound curve 130.

Similarly, a root ID 244 may correspond to some basis for stabilizing a part or all of a multi-curve object 90, or a member compound curve 130. For example, a root ID 244 may identify a root node 100 (e.g. a root 164a, root 164b, root 164c, etc.) below which a multi-curve object 90, a graph 160, or a member compound curve 130 is not to be allowed to be altered. Likewise, a root ID 244 may provide for some truncation of a graph 160 or tree 160 or member compound curve 130.

A test 246 may determine whether or not a node 100 or its associated sub-sequence 70 and associated curve segment 80 are to be subdivided. If the test 246 results in a positive response, a subdivide step 248 may allow for subdivision of a sub-sequence 70. Alternatively, a negative response to the test 246 may result in a further test 252. The test 252 may determine whether or not a lock data structure 92 has been set to prevent the subdivision of a sub-sequence 70.

In one embodiment, a lock process 250 may enable, or effect a locking of a node 100 or a sub-tree corresponding to a node 100 as a root node 100, in accordance with some lock data structure 96. The lock process 240 may be based on a root 98a identified as a root ID 244, a subdivide flag 98c indicating subdivision or lack thereof, an error criterion 98d, or any other attribute 98b.

Thus, a subdivide step 248 or subdivided element 248 may be based on an attribute 242, a root ID 244, or the like. Accordingly, any other process 248 may be substituted for the subdivision 248. However, in one presently preferred embodiment, subdivision of sub-sequences 70 may be prevented by a subdivide test 246 based on a root ID 244, an attribute ID 242, or the like.

Figure 9:
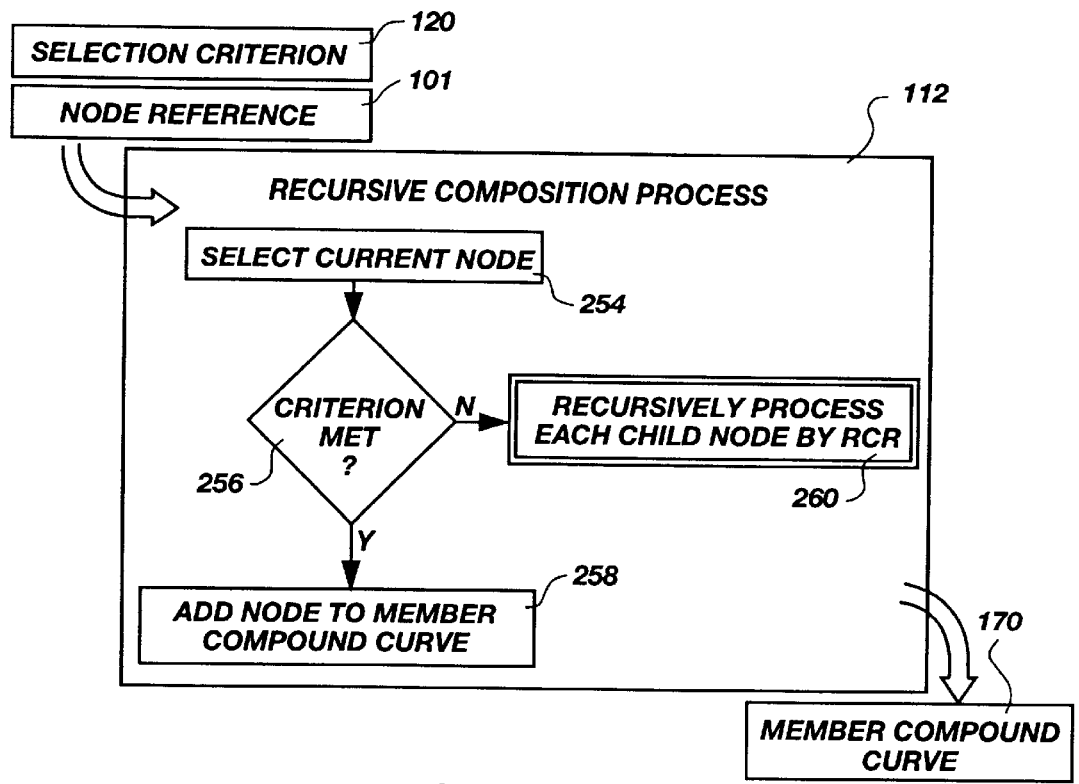
FIG. 9 is a schematic block diagram of a recursive composition process for providing a member compound curve corresponding to and representing a multi-curve object.

Referring now to FIG. 9, the recursive composition process 112 may be provided a selection criterion 120 and a node reference 101. Accordingly, a select current node step 252 may select one of the nodes 100 in a multi-curve object 90. A test 256 may determine whether or not a selection key 92 associated with the select node 100 corresponding to the node reference ID 101 meets a selection criterion 120. One may note that any selection criterion 120 may typically be recast in order to provide a proper output of the test 256. That is, a selection key 92 may be desirable when greater than a selection criterion 120. In such a case, the reciprocal of a selection key 92 may be saved as the selection key 92. Thus, the test 256 need not be recast. Instead, the selection key 92 may be recast in order that the desirable condition is reflected in the test 256.

Thus, if the selection key 92 meets the selection criterion 120, then the node 100 is added 258 by an add node step 258 to the member compound curve 130 being constructed by the recursive composition process 112.

If the selection key 92 does not meet the selection criterion 120, then the test 256 returns a negative response. A negative response results in a recursion 260 that recursively processes each of the node's child nodes by the same recursive composition process 112. Thus, the double box 260 reflects the recursion of the recursion composition process 112. Eventually, all nodes 100 that are to be made members of a member compound curve 130, 170 may be provided by the process 112. This will typically occur only if the member compound curve contains all leaf nodes.

Referring now to FIG. 10, the recursive rendering/un-rendering process 114 may be referred to as simply a rendering/un-rendering process, or even as a rendering process 114 or an un-rendering process 114. The recursive rendering/un-rendering process 114 operates similarly for the processes of rendering 114 and un-rendering 114. Whereas the recursive composition process 112 creates a member compound curve 130, the recursive rendering/un-rendering process 114 determines the display or rendering of the member compound curve 130.

One may note that the selection criterion 120 may be thought of generically. For example, for any process, some selection criterion 120 may used. A selection criterion 120 used in one process may or may not be the same value of a selection criterion 120 used in another process. However, in certain embodiments, it may be the same shared value. The recursive rendering/un-rendering process 114 may be provided with a selection criterion 120 and a node reference 101 identifying a particular node 100 of a multi-curve object 90.

A select current node step 264 begins with the node 100 identified by the node reference 101. A test 266 determines whether or not a selection key 92 corresponding to a node 100 meets a selection criterion 120. In general, as explained for the test 256, the test 266 may always be cast as a comparison in any direction desired.

Thus, a positive response to the test 266 results in a render step 268 or an un-render step 268 that will render or un-render 268, respectively, a particular curve segment 80 associated with a node 100 that is the current node 100 selected 264.

A negative response to the test 266 results in a recursion 270. The recursion 270 recursively processes each child node 94 or each node 91, 100 referenced in the linking reference 94 of the selected node 100 selected 264 by the process 114. It may be convenient to think of a node 100 as being a node 101 (the node ID 101) whereas a child node may be thought of as a node 100 corresponding to the linking reference 94 of a parent node 101. Thus, the recursion 270 is double boxed. Thus, the recursive rendering/un-rendering process 114 is re-represented by the recursion 270. Accordingly, the recursion 270 will process each of the child nodes 94 corresponding to the parent node 101 any time that the selection key 92 does not meet the selection criterion 120 in the test 266.

Completion of the recursive rendering/un-rendering process 114 results in an image 262. One may note that the image 262 is created recursively, one curve segment 80 at a time. Each curve segment 80 is rendered 268 or un-rendered 268 as needed. In one embodiment, the rendering/un-rendering 268 may wait until completion of all recursion 270.

Figure 11:
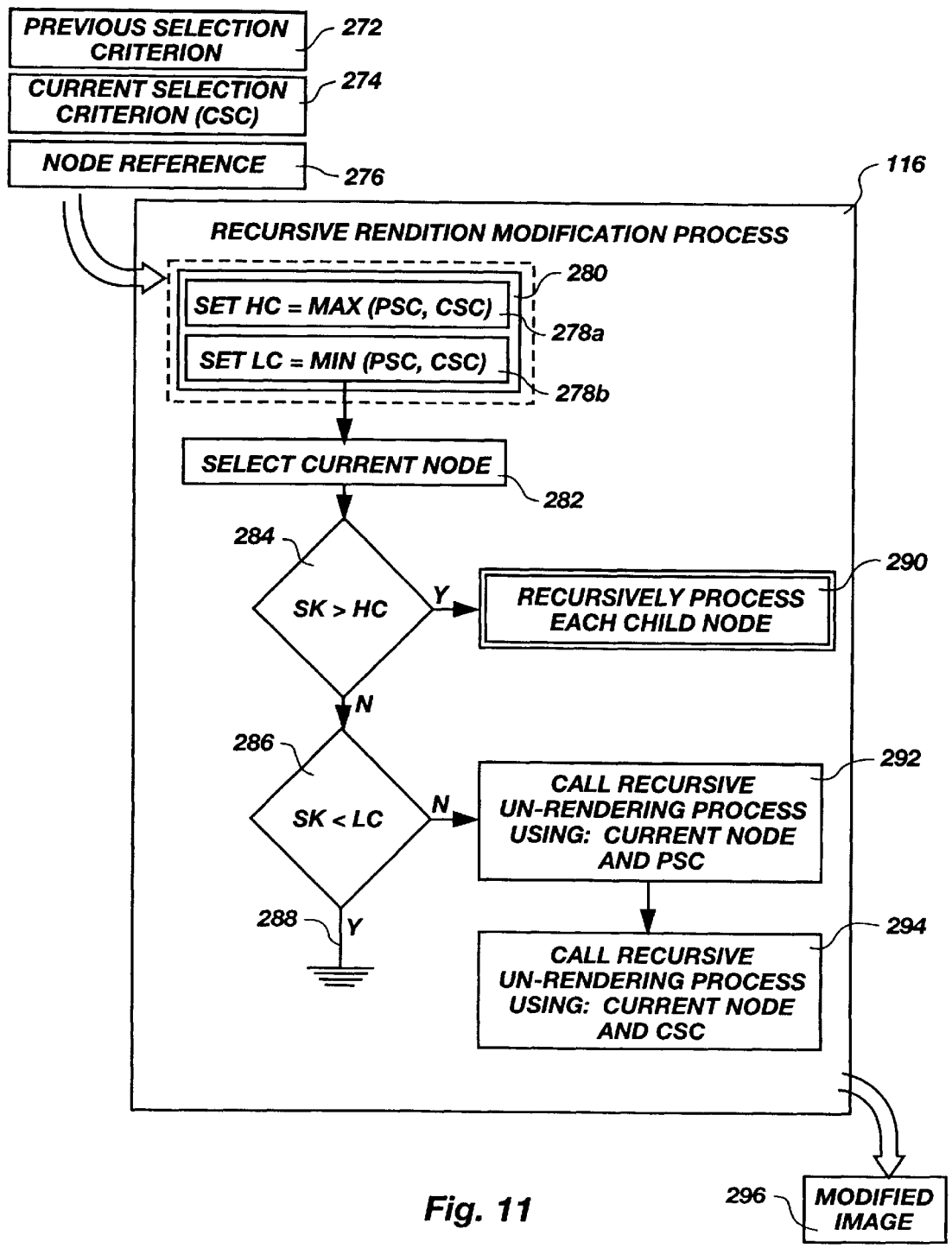
FIG. 11 is a schematic block diagram of a recursive rendition modification process for determining engagement of a recursive rendering and un-rendering process for an image generated according to some selection criterion, when that selection criterion is altered to produce a modified image.

Referring now to FIG. 11, the modification process 116 or modification module 116 may provide a recursive rendition modification process for controlling the use of the recursive rendering/un-rendering process 114. In one embodiment, an optional setup 280 (primer) may be provided within the modification module 116. In an alternative embodiment, the setup 280 may be provided outside the modification module 116. Thus, FIG. 5 illustrates a primer 182 (e.g. setup) outside of a recursive building module 190. By contrast, the setup 280 is illustrated within the modification module 116, and surrounded by a dashed line indicating that the setup 280 is optional. However, as a practical matter, the setup 280 may require only minimal processing. Therefore, inclusion of the setup 280 in the module 116 is easily permissible.

The modification module 116 may be provided a previous selection criterion 272. The previous selection criterion (PSC) 272 corresponds to a selection criterion 120 that has been used in a preceding rendering or rendition modification step. Similarly, the modification module 116 may be provided. A current selection criterion (CSC) 274 corresponds to a selection criterion 120 which, in general, is different from (PCS) 272, and is in effect for a current rendition modification step 116. Likewise, a node reference 276 may be provided. The node reference 276 may correspond to the node ID 101 identifying a particular node 100 to be operated on by the modification process 116.

In the setup 280, a set step 278a may set a high criterion 278a to a value that is the greater of the previous selection criterion 272, and the current selection criterion 274. A set step 278b may set a lower criterion equal to the lesser of the previous selection criterion 272 and the current selection criterion 274. Thus, the high criterion 278a, and the low criterion 278b may be thought of as being provided by respective executables 278a, 278b. Note that the high criterion 278a and the low criterion 278b did not reflect whether or not either is a previous selection criterion 272, or a current selection criterion 274.

A select current node step 282 provides the node 100 identified by the node reference 276 as the data structure 100 to be processed by the modification module 16, Accordingly, a test 284 determines whether or not a selection criterion 92 associated with the current node 276 is greater than the high criterion 278a. As mentioned above, the test 284 may always be cast in such a way that the failure of a selection key to meet the high criterion may be reflected by the comparison illustrated in the test 284. Thus, the selection key 92, if providing a negative response to the test 284, results in a further test 286.

The test 286 determines whether the selection key 92 corresponding the current node 276 (e.g. the selected current node 282, and node 100 selected) meets the lower criterion 278a. Note that a node 276 whose selection key 92 provides a negative response to the test 284 does meet the high criterion. Meanwhile, the condition existing that node 276 meets the lower criterion 278b provides a positive response to the test 286. Thus, the positive response 288 results in grounding the modification process 116. That is, any node 276 whose selection key 92 results in the response 288 meets both the high criterion 278a and the low criterion 278b. Accordingly, such a node 276 meets both a previous selection criterion 272 and a current selection criterion 274 without determination of which is which. Thus, grounding 288 indicates that no modification will be made to either un-render, or replace the node 276.

Note that the node reference 276 is provided with each instance of the recursion module to 116. Thus, the node reference 276 may be provided from outside the modification module 116 into another recursion 290 of the modification module 116.

A positive response to the test 284 indicates that the 9 selection key 92 associated with a node 276 selected 282 does not meet the high criterion 278a. Accordingly, the recursion 290 must recursively process each of the node's child nodes 94 (e.g. corresponding to the references 94, pointers 94) of the node 276 (node 100 referenced by the node reference 276 as the node ID 101). The double box illustrated indicates that the recursion 290 corresponds to a recursive instance of the recursion module or modification module 116.

If the test 286 results in a negative response, then the selection key 92 of the node 276 does meet the high selection criterion 278a, but does not meet the low criterion 278b, thus the node 276 has a change in status. The node 276 does meet one selection criterion 272, 274, but does not meet the other selection criterion 274, 272. However, it is known at this point whether the previous selection criterion 272 or the current selection criterion 274 is met. This is not an ambiguity. In general, a user may elect to relax a selection criterion 120 or to further restrict a selection criterion 120. The modification process 116 accommodates either direction of change for a new member compound curve 131 with respect to a member compound 130 previously created.

A negative result from the test 286 results in a call 292 and a call 294. The call 292 calls a recursive un-rendering process 114. The recursive un-rendering process 114 or module 114 is provided with the current node 282 represented by the node reference 276 that is being used by the modification module 116. Likewise, the previous selection criterion 272 is provided to the recursive un-rendering process 114 as the selection criterion 120 (see FIG. 10).

For example, the call 292 calls the recursive rendering/un-rendering process 114 in an un-rendering mode to un-render a portion of the multi-curve object rooted at the current node 282. The current node 282 identified by the node reference 276 in the modification module 116 and the previous selection criterion 272 are passed to the recursive un-rendering module 114 by the call 292. Thus, a portion of the multi-curve object rooted at a particular node 282, 276 may be un-rendered 268, just as it might be rendered.

Likewise, the call 294 may call the recursive rendering process 114 in a rendering mode. The call. 294 passes the current node 282, 276 from the modification module 116 to the recursive rendering/un-rendering process 114. Thus, the call 294 incurs the recursive rendering process 114 with the current node 282 identified by the node reference 276 in the modification process 116 as the current node 264 identified by the node reference 101 in the recursive rendering process 114 of FIG. 10.

Similarly, the current selection criterion 274 is passed by the call 294 to the recursive rendering process 114 or module 114 as the selection criterion 120. Thus, an image 262 output by the recursive rendering/un-rendering process 114 may represent only a portion of a member compound curve 130, a re-used portion 132, upon un-rendering. Thereafter, the image 262 presented after rendering 114 (rendering mode of process 114) may represent the new member compound curve 131. The new member compound curve 131 has the re-used portion 132 and the replacement portion 136, provided in response to the call 294 of the modification process 116.

One may think of the render/un-render process 268 or step 268 as doing or undoing, respectively, the conditions of a rendering of a curve segment 80, as appropriate. Un-rendering is not necessarily rendering a negative image, rendering an opposite image or the like. Un-rendering 268 may simply reflect undoing whatever a rendering 268 might do.

Figure 12:
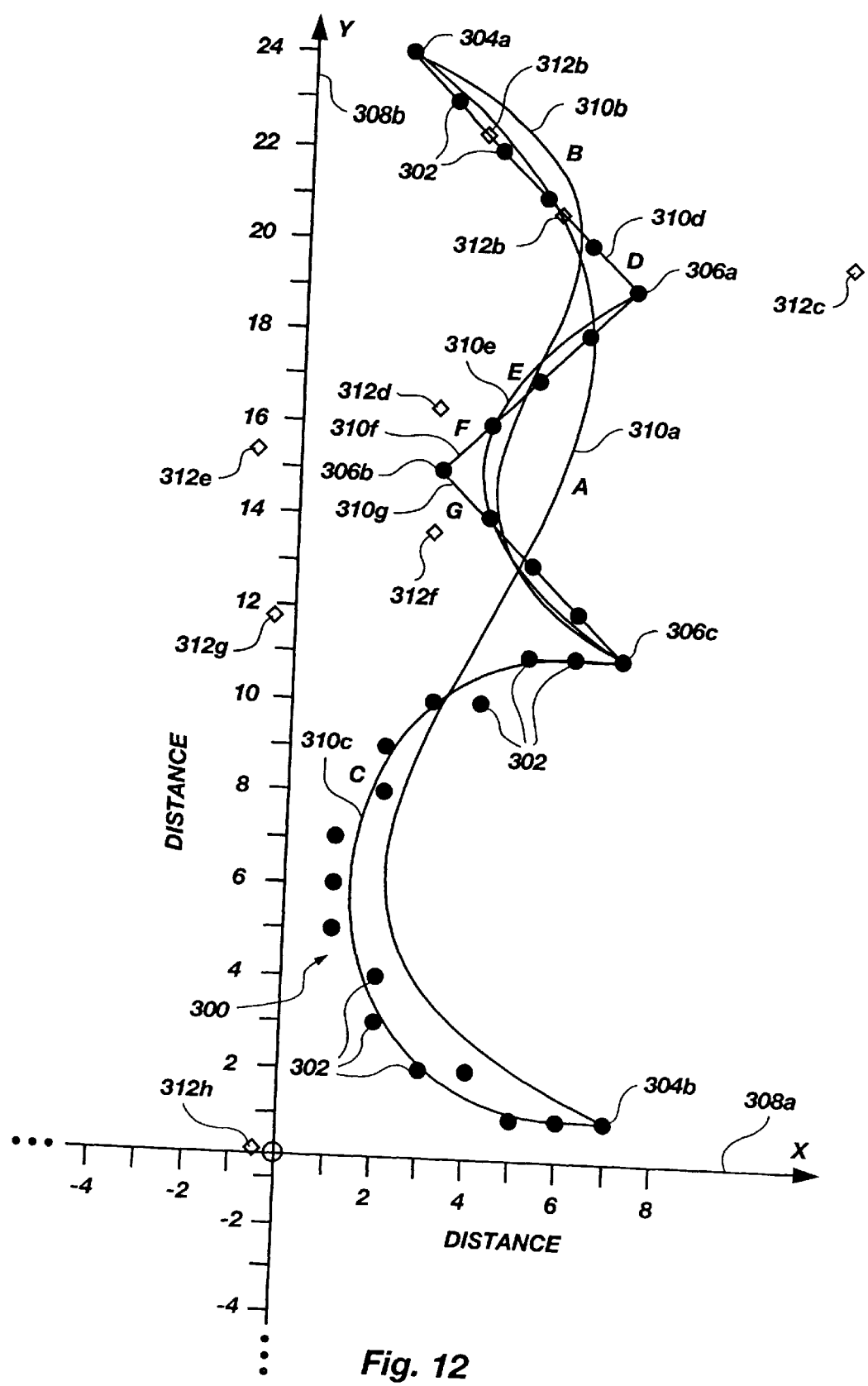
FIG. 12 is a schematic block diagram of a sequence of points for which a multi-curve object has been created, and multiple member compound curves have been created to represent the sequence of points.

Referring now to FIG. 12, and generally to FIGS. 12–20, A sequence 300 of points 302 may be provided. In the example of FIG. 12, the points 302 are illustrated in a two-dimensional, spatial domain. The sequence 300 is open, since the end points 304a, 304b are not identical. Between the end points 304a, 304b, may be located joints 306. Determining joints 306 may be done by any of several methods available. Visual inspection, mathematical analysis, arbitrary selection, averaging the distance between end points 304a, 304b, and a host of other methods exist for selecting the joints 306. The axes 308a, 308b define the domain of the sequence 300. Alternatively, the axis 308a may be referred to as a domain, while the axis 308b is defined as a range, or vice versa. These illustrated two dimensions 308a, 308b may be any number of dimensions.

The sequence 300 may be fit by one of several curve segments 310. A single curve segment 310a may be fit to all points 302 in the sequence 300. Alternatively, or subsequently, the sequence 300 may be subdivided to be fit with various curve segments 310b–310g. In one embodiment, the curve segments 310 may be Bézier curves 310. Accordingly, the control points 312 illustrated as control points A 312a–h (and others not illustrated) may operate in conjunction with the end points 304a, 304b and various joints 306a, 306b, 306c to form the characterizations 86 (see FIG. 2) of the various curve segments 310a–310g.

Figure 13:
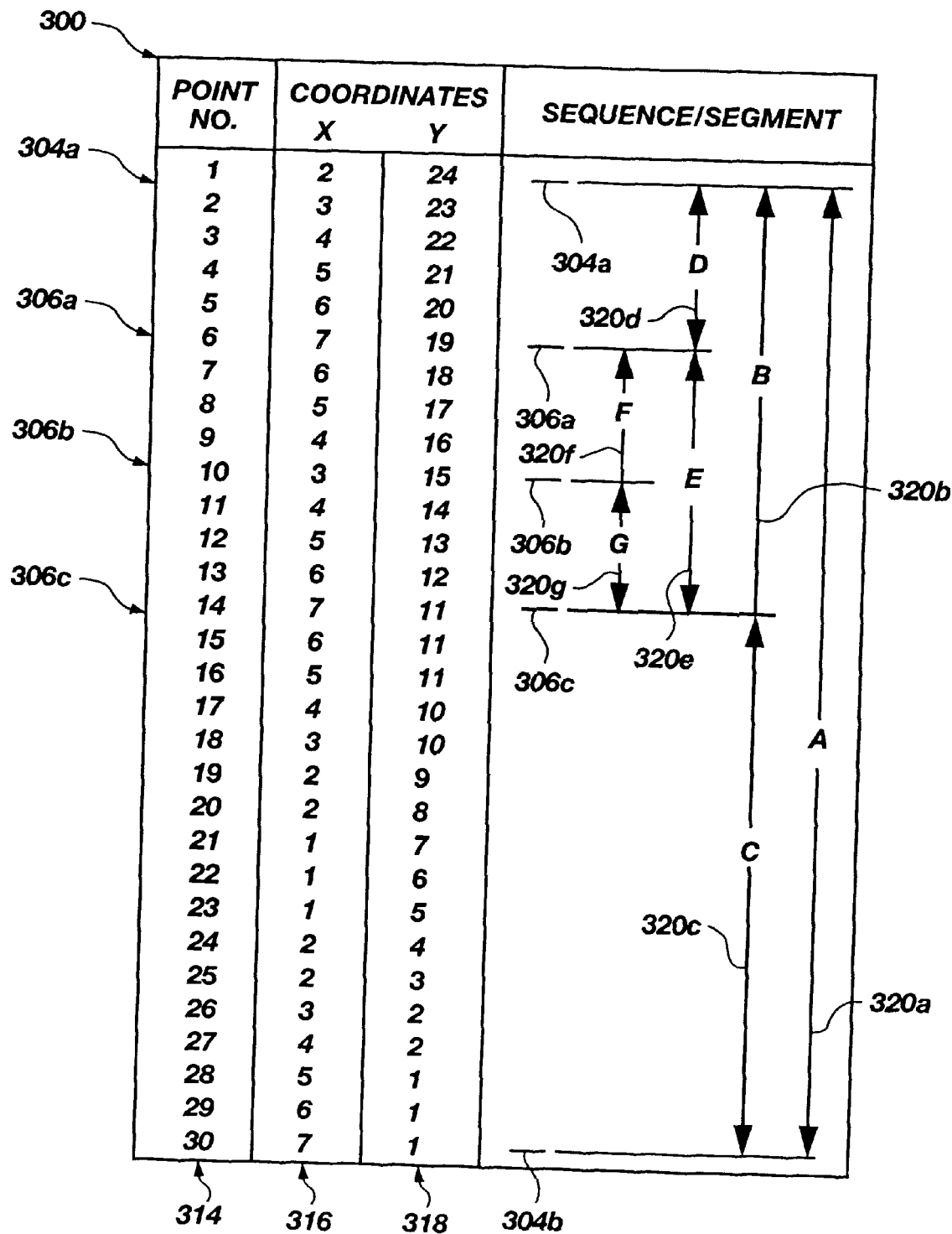
FIG. 13 is a schematic block diagram of the sequence of points corresponding to the multi-curve object of FIG. 12.

Referring now to FIG. 13, the sequence 200 may be represented as tuples or ordered pairs 316, 318. That is each of the coordinates 316, 318 is part of an ordered pair corresponding to a particular point number 314 numbered for convenience in the illustration of FIG. 13. Thus, an x coordinate and a y coordinate 318, corresponding to a particular point number 314, define each of the points 302 of the sequence 300 of FIGS. 12–20, Each of the joints 306 (including the end points 304, that also may be thought of as joints) corresponds to a particular point 314.

The sequence 300 may be represented by a single sequence 320a. The sequence 320a may be thought of as a sub-sequence 320a that includes the entire sequence 300.

In accordance with one embodiment, the sub-sequence 320a may be subdivided into other sub-sequences 320. For example, the sub-sequence A 320a may be subdivided at the joint 306c to form sub-sequence B 320b and sub-sequence C 320c. The sub-sequences 320b, 320c may be fit with curve segments 310b, 310c, with less error than the curve segment A 310a. Similarly, the sub-sequence B 320b may be subdivided into sub-sequence D 320d and sub-sequence E 320e.

The curve segments 310d, 310e may fit the sub-sequences 320d, 320e with less error than does the curve segment 310b. Likewise, the sub-sequence F 320f and sub-sequence G 320g may result from a subdivision of the sub-sequence E 320e. Other things being equal, the curve segments 310f, 310g should fit the sub-sequences F 320f and G 320g with less error than does the curve segment E 320e.

Referring now to FIG. 14, each of the sub-sequences 320 corresponds to a respective curve segment :310. Each of the curve segments 310 may be represented by virtually any form of curve. In one presently preferred embodiment Bézier curves 310 are used. Much of the graphics software available makes use of Bézier curves. Accordingly, curve segments 310 that use the Bézier curve characterization 80, 86 may be particularly useful. Each of the curve segments 310 (e.g. 310a–310g) may be characterized by an appropriate anchor point 322a, control point 324a, control point 324b and anchor point 322b. As explained, the end points 322a, 322b may correspond to the various joints 306 (including the end points 304).

Referring now to FIG. 15, the sequence 300, subdivided into various sub-sequences 320, and fit with an appropriate curve segment 310 may be stored in a multi-curve object 90 of nodes 100 (see FIG. 2). For example, the nodes 326, including individual nodes 326a–326g may each correspond to a respective sub-sequence 320 (e.g. 320a–320g) and a respective curve segment 310 (e.g. 310a–310g). Each of the nodes 326 may be provided with reference links 328. Each of the reference links 328 in the illustrated example, corresponds to another child node 326. For example, the node 326a contains a pointer 328b or reference link 328b identifying the node 326b as a child node with respect to the parent node 326a. Similarly, a reference link 328c identifies the node 326c as a child node 326c of the parent 326a.

Likewise, the node 326b contains the reference links 328d to node 326d, and 328e to the node 326e. Finally, the node 326e contains reference links 328f, 328g to the respective nodes 326f, 326g. Note that the leaf references 329a, 329b may be placed in a node 326c to indicate that the node 326c is a leaf node having no respective child nodes. Alternatively, a node 326 (e.g. 326d, 326f, 326g) may simply indicate the leaf status of a node 326 by virtue of a vacancy for the respective reference links 329c, 329d, 329e, 329f, 329g, 329h, respectively.

Each node 326 may contain a respective selection key 330. The selection keys 330a–330g correspond to the nodes 326a–326g respectively and represent an error 330 associated with each respective curve segment 310 corresponding to a sub-sequence 320 associated with each node 326. A selection criterion 120 (see FIG. 2) may be represented graphically by the various selection criteria 332. For example, the selection criterion 332a represents an error limit 332a that is satisfied by the error 330a associated with the fit of a curve segment 310a to the sub-sequence A 320a.

The multi-curve object 334 (graph 334) of nodes 336 interrelated by links 328 (link references 328) may contain many different member compound curves 336. The curve segment 310a is a single segment 310 fitting the entire sequence 300 with an error 326a that meets the selection criterion 332a. Thus, the selection key 326a (an error 326 corresponds to one type of selection key 92) indicates that the segment A 310a adequately fits the entire sequence 300 if the selection criterion 332a is chosen.

If the selection criterion 332d is selected as a threshold of error, curve segment 310b and curve segment 310 c may be fit to the sub-sequences 320b, 320c to provide respective errors 330b, 330c satisfying the selection criterion 332b.

In like manner, a selection criterion 332c may be selected. Accordingly, the member compound curve 336b does not satisfy the new selection criterion 332c. Rather, the curve segment C 310c still has an error 326c that meets the selection criterion 332c. However, the sub-sequence B 320b must be subdivided into the sub-sequences 320d, 320e. The sub-sequence D 320d is fit by the curve segment D 310d with an error 330d satisfying the selection criterion 332c. Similarly, the sub-sequence E 320e is fit by the curve segment E 310e with an error 330e meeting the selection criterion 332c.

If the selection criterion 332d is chosen, the curve segment E 310e no longer fits the sub-sequence E 320e with an error 326e meeting the selection criterion 3.32d. Accordingly, the sub-sequence E 320e is subdivided into sub-sequence F 320f and sub-sequence G 320g. Accordingly, the sub-sequence F 320f and sub-sequence G 320g may be fit, respectively, with the curve segment F 310f and curve segment G 310g, with errors 330f, 330g meeting the selection criterion 332d.

Thus, FIG. 15 illustrates various member compound curves 336a, 336b, 336c, 336d corresponding to the selection criteria 332a, 332b, 332c, 332d, respectively. In FIG. 15, the first nodes 326, above a particular selection criterion 332 (dashed line 332) correspond to those errors 330 meeting the respective selection criterion 332. Each member compound curve 336 is composed of selected nodes 326 from the multi-curve object 334 containing all nodes 326.

Figure 16:
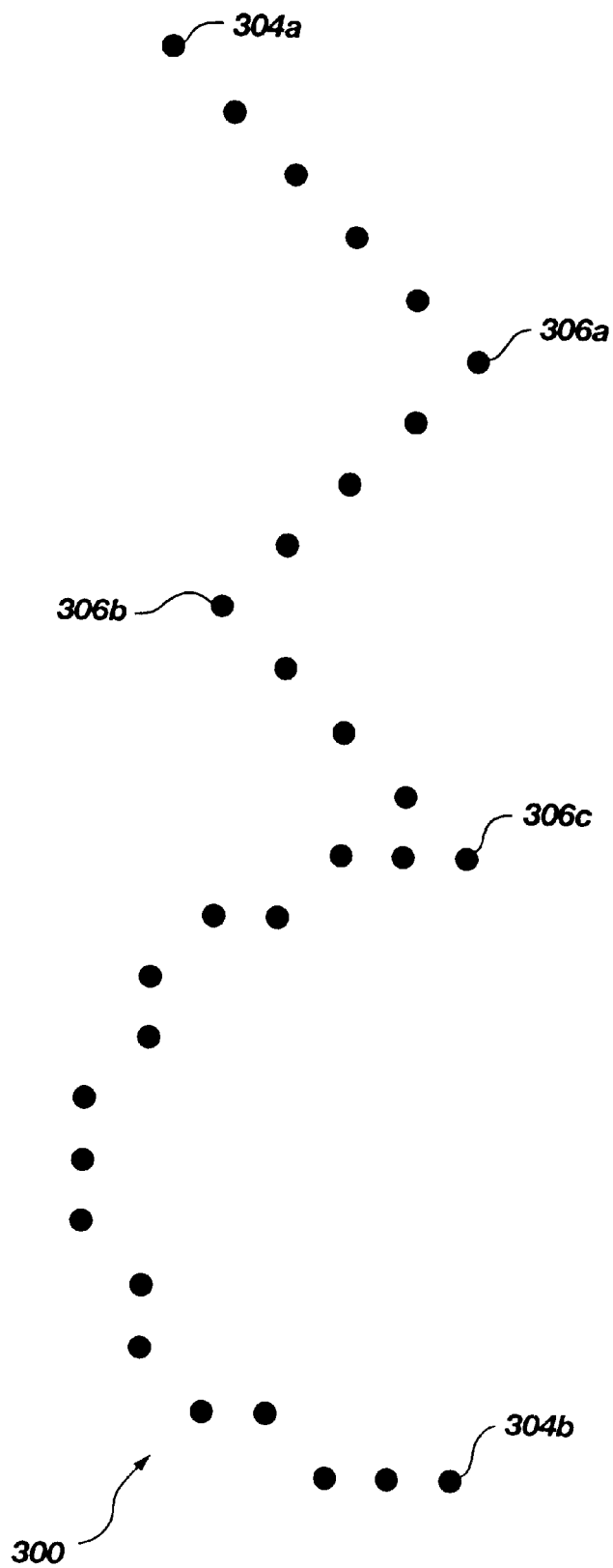
FIG. 16 is a schematic illustration of the points of the sequence of FIGS. 12–15.
Figure 17:
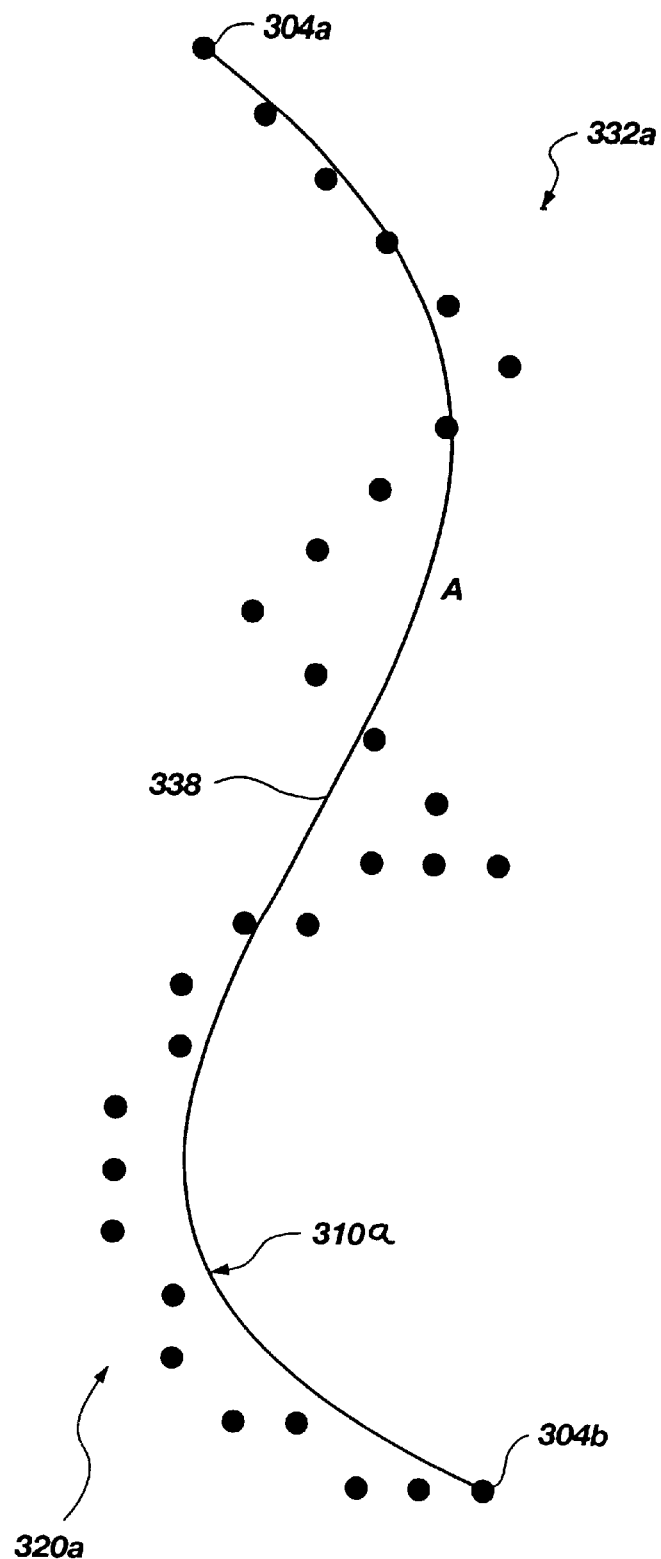
FIG. 17 is a schematic illustration of the sequence of points of FIGS. 12–15 with a single curve segment fitted thereto.

Referring now to FIG. 16, and generally to FIGS. 16–20, the individual sub-sequences 320 fit with corresponding curve-segments 310 are illustrated. One may note in FIG. 17, that an inflection point 338 may be an alternative selection for a joint 306. For example, the joint closest to the inflection point 338 or a mid-point of the curve segment 310a may be selected for sub-dividing the sequence 320a. Thus, in FIG. 18 the joint 306c provides a next reasonable location for subdividing the sub-sequence A 320a. Similarly, a inflection point 338a in FIG. 18 may be used to select the nearest joint 306a for subdivision of the sub-sequence B 320b into the sub-sequences D 320d and E 320e. FIG. 12 illustrates all sub-sequences of 320, joints 306, and curve segments 310 superimposed. FIG. 16–20 illustrate the individual sub-sequences 320 fit with respective curve segments 310. FIG. 16 illustrates the sequence 300 with end points 304a, 304b and other joints 306a–306c. FIG. 17 illustrates sub-sequence A 320a fit with the curve segment A 310a extending between the end points 304a, 304b. Curve segment A 310a is a member compound curve 310 (e.g. such as a generic member compound curve 130) representing the multi-curve object 334 of FIG. 15.

Figure 18:
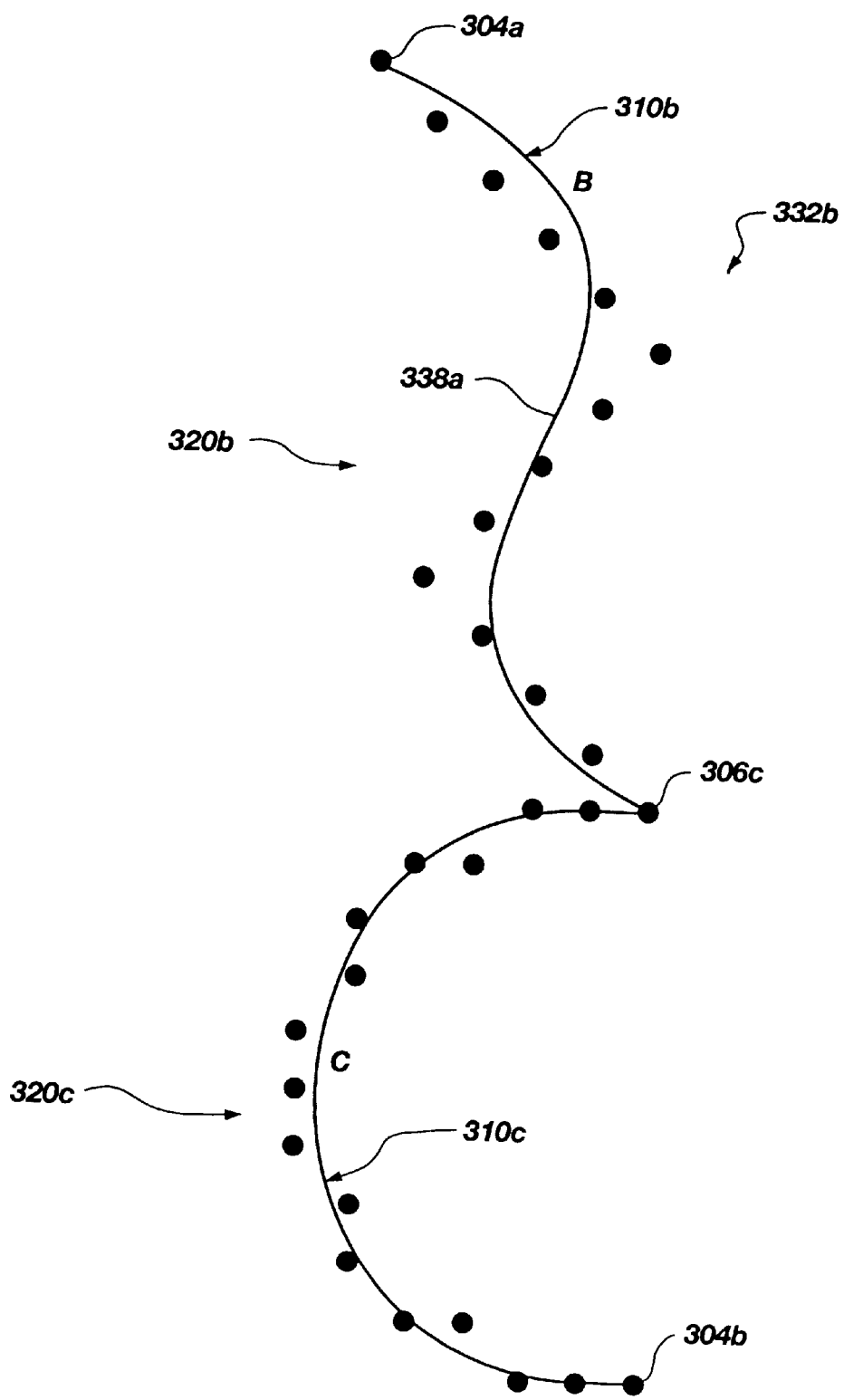
FIG. 18 is a schematic illustration or the sequence of points of FIG. 12 illustrating two curve segments fitted thereto.
Figure 19:
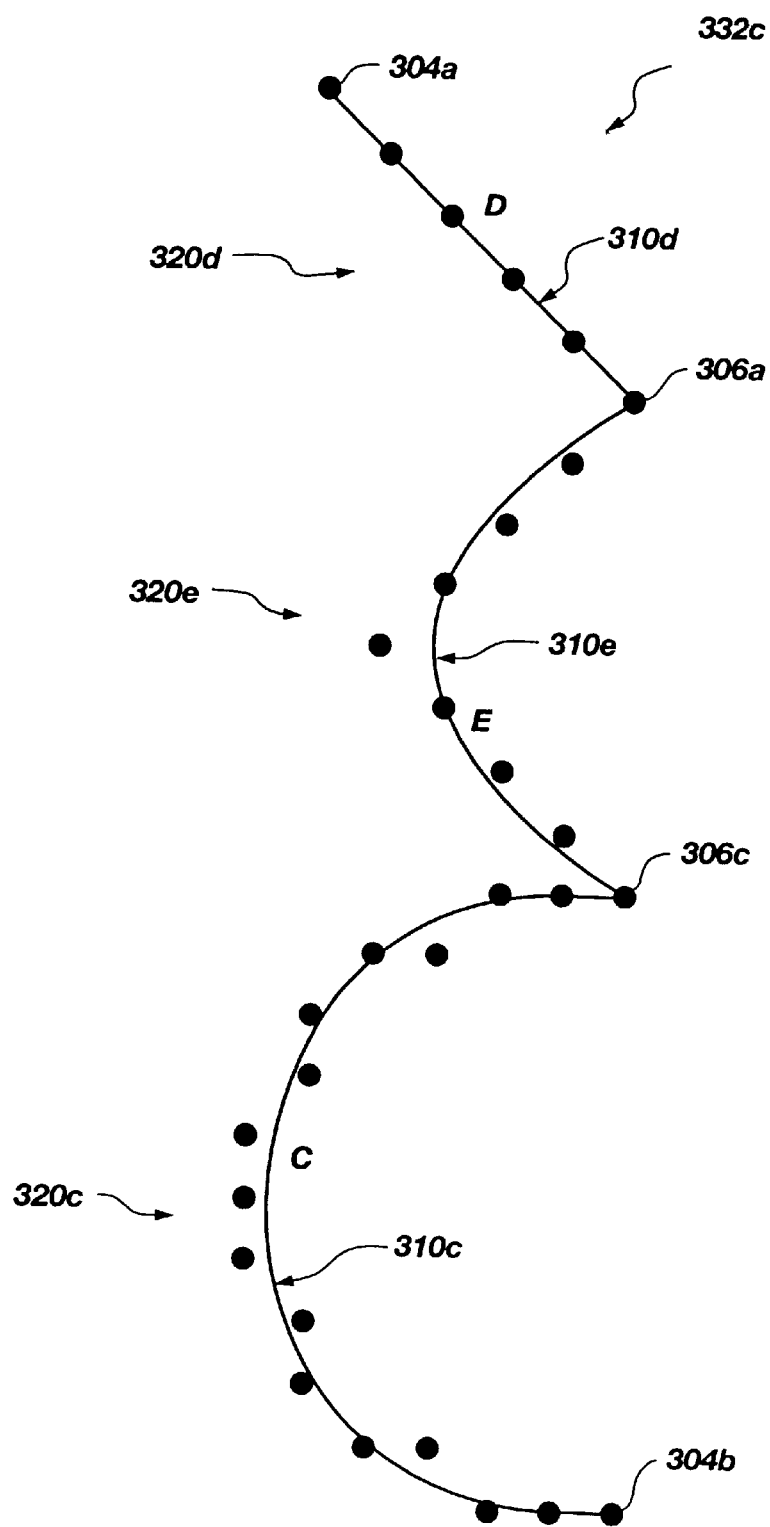
FIG. 19 is a schematic illustration of the sequence of points of FIG. 12 using three curve segments fitted thereto.
Figure 20:
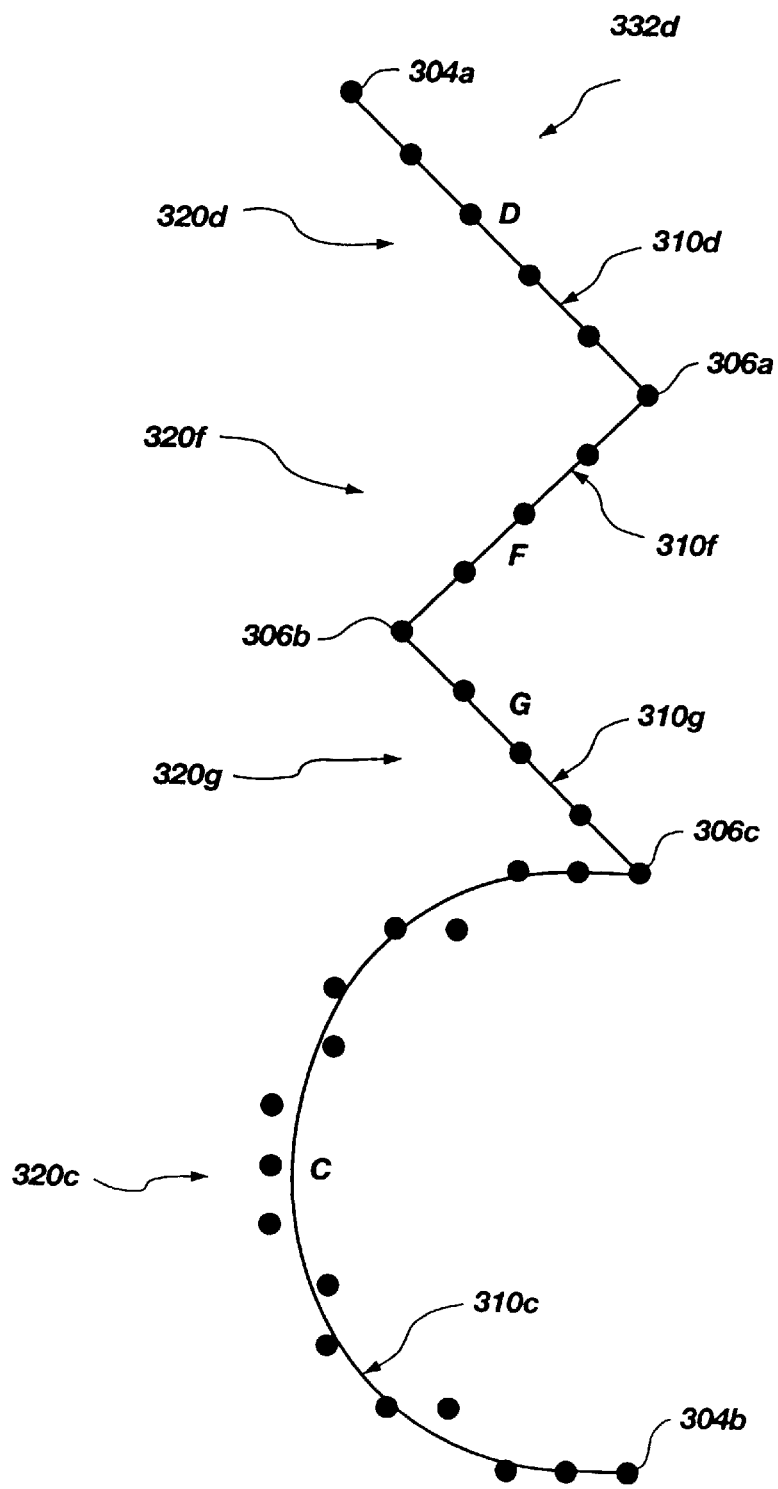
FIG. 20 is a schematic illustration of the sequence of points of FIG. 12 using four curve segments fitted thereto as a member compound curve representing a multi-curve object corresponding to the sequence.
Figure 21:
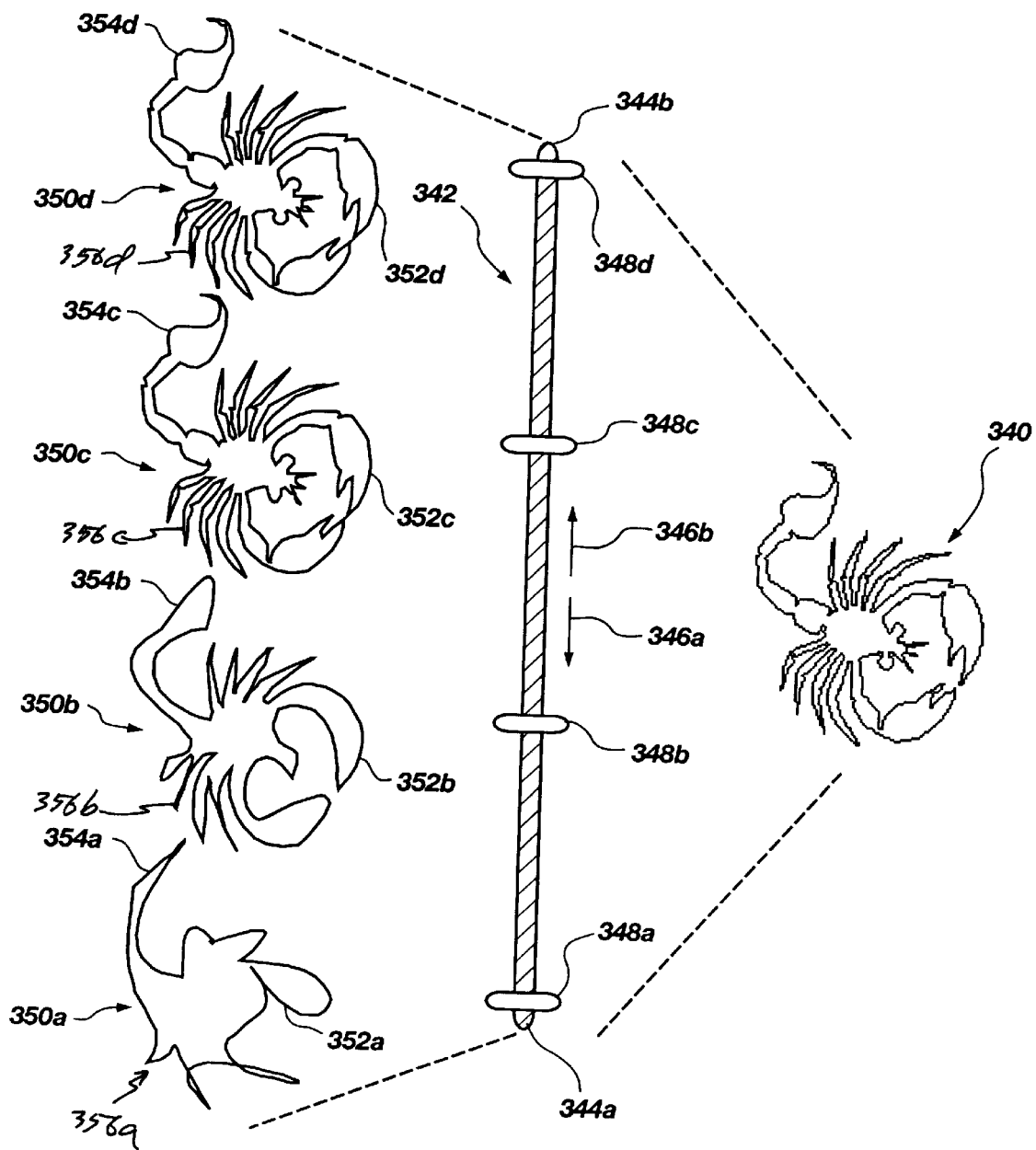
FIG. 21 is a schematic illustration of an arbitrarily selectable level of error of fit for representing a bitmapped image of a scorpion, and illustrating the resulting renditions of a tracing of the bitmapped image in accordance with selection of different levels of error of fat by a user.

FIG. 18 illustrates sub-sequence B 320b and sub-sequence C 320c. Curve segment B 310b and curve segment C 310c fit the respective sub-segments B 320b and C 320c, respectively. FIG. 19 illustrates the new member compound curve 336c. The new member compound curve 336c includes the curve segments C 310c, D 310d, and E 310e fitted to the respective sub-sequences capital C 320c, D 320d, and E 320e. FIG. 20 illustrates the new member compound curve 332d including each of the curve segments C 310c, D 310d, F 310f, and G 310g fit to the respective sub-sequences C 320c, D 320d, F 320f, and G 320g, respectively.

It is noteworthy that the sub-sequence D 320d is fit with a straight line 310d. Nevertheless, a sub-sequence D 320d could rely on multiple curve segments 310. However, no additional improvement in the error 330d of the node 326d (see FIG. 15) is obtained by using additional curve segments 310 or sub-sequences 320.

Similarly, but for a different reason, the sub-segment C 310c fitted to the sub-sequence C 320c never changes with each of the selection criteria 332c, 332d. The error 330c of the node 326c corresponding to the curve segment C 310c has an error 330c sufficient to meet each of the selection criteria 332b, 332c, 332d (see FIG. 15).

Referring now to 21, an image 340 may be provided as a bitmap 340. In other embodiments, an image 340 may be provided from a photograph, vector-based image, or the like. A scale 342 represents a continuum 342 for use as an selection criterion 120 for use in rendering. The extreme 344a, 344b of the scale 342 represent a minimum 344a and a maximum 344b, respectively, value available for a selection criterion 120. In one embodiment, the extreme 344a, 344b may represent a maximum allowable error and a minimum allowable error, respectively.

Thus, the directions 346a, 346b indicate, respectively, increasing and decreasing values of an error 330 to be tolerated by a selection criterion 120. Thus, a user may graphically visualize a selection of a location 348 or selection criterion 348 on the scale 342. For example, the selection criterion 348a or location 348a on the scale 342 results in a member compound curve 350a, or image 350a, representing a multi-curve object 90 (e.g. 334 in FIG. 15) corresponding to a fit of the bitmap 340 according to a selection criterion 348a (e.g. threshold error 348a).

With each of the respective restrictions of the selection criteria 348b, 348c, 348d to increasing precision and decreasing error of the fit for the member compound curves 350b, 350c, 350d, respectively, both desirable and undesirable results occur. For example, the selection criterion 348b results in a member compound curve 350b or image 350b that represents the scorpion of the image 340 more realistically and precisely than does the member compound curve 350a. Similarly, the selection criterion 348c results in a member compound curve 350c that even more accurately (e.g. with less error) represents the image 340 and a corresponding multi-curve object 90.

However, the selection criterion 348d on the scale 342 actually over-specifies the member compound curve 350d. That is, the bitmap 340, or image 340, is itself not extremely accurate or smooth due, possibly, to quantization error. Note that the representation 352 of the claw contour 352, and the representation of the stinger contour 354 seem to be optimized by the member compound curve 350c. The reduced error associated with the selection 348d results in a member compound curve 350d that appears to be tuning or improving toward erroneous features of the image 340.

For example, the claw representation 352a, is probably less desirable than the representation 352b. The representation 352c is better yet. However, the representation 352d of the claw begins to reflect spurious, jagged edges from the original image 340. Similarly, the representation 354a of the stinger, may be regarded inferior to the representation 354b. Meanwhile, the representation 354c is much improved. However, the representation 354d again begins to reflect the jagged, spurious edges from the original image 340.

Thus, an increased precision (reduced error) for a selection criterion 348 (e.g. 348d) may eventually produce a less desirable member compound curve 350d. The claw contours 352a–352d and the stinger contours 354a–354d, do not represent a monitonically "improving" rendition. Other areas of "improvement" may include reduction in storage. Aesthetics is not the only valid quality which may be optimized by a "middle valued" selection criterion.

Strictly speaking, the member compound curves 350 may be thought of as renditions of particular member compound curves 350. One may note that the leg contour 356a is confused at best, while improved in the leg contour 356b. The leg contour 356c seems adequately improved, and the leg contour 356d appears unchanged over the leg contour 356c. Thus, the leg contour 356c and the leg contour 356d may be represented by the same set of nodes 100, remaining unchanged, and remaining in the respective member compound curves 350c, 350d. Meanwhile, the stinger contour 354c is replaced at least partially, by the stinger contour 354d as the member compound curve 350c is modified to the member compound curve 350d.

From the above discussion, it will be appreciated that the present invention provides a multi-curve object created to represent curve segments fitted to a sequence of points. The multi-curve object may be represented as a graph containing nodes. Each node may include a curve characterization representing a particular sub-sequence of the sequence of points. Each node may also include a selection key for determining whether or not that particular node is to be included in a member compound curve representing a particular rendition of the multi-curve object. Binding data may be included in pointers or other reference information associated with each node, thus linking nodes together in a graph forming a multi-curve object. A member compound curve may be formed by recursively selecting nodes whose selection keys meet some selection criterion selected by a user. A recursive rendering and un-rendering process or module may intelligently un-render and re-render curve segments that are to be removed and added, respectively, to an image corresponding to a member compound curve.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by united States Letters Patent is:

1. An apparatus for prescriptively and proscriptively, arbitrarily, selecting a compound curve representing a multi-curve object, the apparatus comprising:

a processor programmed to build a multi-curve object and to receive inputs to control rendition of a compound curve representing the multi-curve object;

an input device operably connected to the processor for providing the inputs controlling selection of curve segments to be composed into the compound curve;

an output device operably connected to the processor for providing a rendition of the compound curve; and a memory device operably connected to the processor to store data structures comprising:
a sequence of points, subdividable into sub-sequences and corresponding to the multi-curve object,
a plurality of curve segments corresponding to the sub-sequences,
a selection criterion, and
a selection executable, executable by the processor to select, from the curve segments, selected curve segments to be composed into the compound curve in accordance with the selection criterion.

2. The apparatus of claim 1, wherein:

the output device is a display; and the data structures further comprise a rendering executable effective to render the compound curve on the display.

3. The apparatus of claim 1, wherein the data structures further comprise:

a new selection criterion; and a selection modification executable, executable by the processor to selectively re-use and replace each of the selected curve segments in accordance with the selection criterion and the new selection criterion.

4. The apparatus of claim 3, wherein:

the output device is a display; and the selection modification executable is further effective to provide a new compound curve, comprising a re-used portion, selected from the compound curve, and a replacement portion, by un-rendering from the display a replaced portion of the compound curve in accordance with the selection criterion, and rendering on the display the replacement portion in accordance with the new selection criterion.

5. The apparatus of claim 1, wherein the data structures further contains a plurality of selection criteria for selecting multiple compound curves in accordance therewith.

6. The apparatus of claim 1 wherein the data structures further comprise a graph representing the multi-curve object.

7. The apparatus of claim 6, wherein the graph further comprises nodes, each node corresponding to a curve segment and containing:

a characterization of the curve segment:;

a selection key reflecting a value to be used for a comparison;

a plurality of references for linking the node to other nodes.

8. The apparatus of claim 7, wherein the plurality of references link the node, serving as a parent node, to child nodes.

9. The apparatus of claim 7, wherein the selection key reflects an error corresponding to a fit of the curve segment to a corresponding sub-sequence.

10. The apparatus of claim 6, wherein the graph is a tree.

11. An article comprising a memory device storing data structures for use in association with execution by a processor for prescriptively and proscriptively, arbitrarily, selecting a compound curve representing a multi-curve object, the data structures comprising:

a creation executable, executable by the processor to build a multi-curve object;

an interaction executable for selecting a selection criterion;

the selection criterion;

a sequence of points, subdividable into sub-sequences and corresponding to the multi-curve object, a plurality of curve characterizations, each corresponding to a curve segment and associated sub-sequence of the sequence;

a selection executable, executable by the processor to select, from the curve segments, included curve segments to be composed into the compound curve in accordance with the selection criterion.

12. The article of claim 11, wherein the selection criterion corresponds to an error of fit between a curve segment and associated sub-sequence.

13. The article of claim 11, wherein the data structures further comprise a rendering executable effective to render the compound curve on a display.

14. The article of claim 13, wherein the rendering executable further provides a new compound curve, comprising a re-used portion, selected from the compound curve, and a replacement portion, by un-rendering from the display a replaced portion of the compound curve in accordance with the selection criterion, and rendering on the display the replacement portion in accordance with the new selection criterion.

15. The article of claim 14, wherein the data structures further comprise:

a new selection criterion; and a selection modification executable, executable by the processor to selectively re-use and replace each of the selected curve segments in accordance with the selection criterion and the new selection criterion.

16. The article of claim 11, wherein the data structures further comprise a graph representing the multi-curve object.

17. The article of claim 16, wherein the graph further comprises nodes, each node corresponding to a curve segment and containing:

a characterization of the curve segment;

a selection key reflecting a value to be used for a comparison;

a plurality of references for linking the node to other nodes.

18. The article of claim 17, wherein the plurality of references link the node, serving as a parent node, to child nodes.

19. The article of claim 17, wherein the selection key reflects an error corresponding to a fit of the curve segment to a corresponding sub-sequence.

20. The article of claim 16, wherein the graph is a tree.

21. A method for interacting with a multi-curve object, the method comprising:

providing a sequence of sample points;

identifying joints associated with the sequence, each joint corresponding to a sample point;

providing a node data structure for storing data reflecting a curve segment, selection key associated with the curve segment, and plurality of references;

providing a plurality of nodes, each node comprising an instantiation of the node data structure; and providing a graph representing a multi-curve object and relating the plurality of nodes to one another according to links effected by the references.

22. The method of claim 21 wherein the selection key corresponds to an error.

23. The method of claim 22, wherein the error reflects an error of a fit of the curve segment to a sub-sequence of points selected from the sequence.

24. The method of claim 23, wherein the curve segment spans a path approximating the sub-sequence of sample points.

25. The method of claim 21, wherein the graph is a tree.

26. The method of claim 21, further comprising creating the multi-curve object to order the nodes in a hierarchy according to the selection key corresponding to each of the nodes.

27. The method of claim 26, wherein the hierarchy reflects a ranking of a selection key of a parent node with respect to a selection key of a child node.

28. The method of claim 26 wherein creating the multi-curve object is effected by a method selected from the group consisting of recursion and iteration.

29. The method of claim 21, wherein the selection key is an error reflecting a fit of a curve segment to a corresponding sub-sequence of points selected from the sequence.

30. The method of claim 21 further comprising:

traversing the multi-curve object to select a member compound curve representing the multi-curve object and corresponding to selected nodes, each corresponding to a selection key having a selection key value satisfying a selection criterion; and rendering the member compound curve using selected data structures corresponding to the selected nodes.

31. The method of claim 30 wherein the traversing further comprises recursing.

32. The method of claim 31, wherein recursing comprises:

beginning a traversal at a primal root of the multi-curve object;

recursively identifying a node as a current node having a current selection key corresponding thereto, if the current selection key is higher than the selection criterion, continuing the traversal by recursively designating as a current node each child node pointed to by the current node;

if the current selection key is not higher than the selection criterion, rendering the curve segment corresponding to the current node.

33. The method of claim 30 further comprising replacing the member compound curve with another member compound curve by:

selecting and keeping a re-used portion selected from the member compound curve and included in the other member compound curve, identifying and un-rendering a replaced portion from the member compound curve, and selecting and rendering a replacement portion of the other member compound curve, replacing the replaced portion.

34. The method of claim 33, wherein replacing further comprises:

providing a previous rendering criterion and a current rendering criterion, selecting a high value corresponding to the greater of the previous and current rendering criteria, selecting a low value corresponding to the lesser of the previous and current selection criteria, traversing the multi-curve object to classify nodes corresponding to the re-used portion, the replaced portion, and the replacement portion, based on a relationship of the high and low values to selection keys corresponding to the nodes.

35. The method of claim 34, wherein traversing further comprises:

beginning a traversal at a primal root of the multi-curve object;

recursively identifying a current node and a current selection key corresponding thereto, if the current selection key is higher than the high value, continuing the traversal by recursively designating as a current node each child node pointed to by the current node;

if the selection key is not higher than the high value and is higher than the low value, recursively un-rendering curve segments corresponding to replaced nodes rooted at the current node and meeting the previous rendering criterion, and recursively rendering curve segments corresponding to replacement nodes rooted at the current node and meeting the current rendering criterion.

36. The method of claim 35 wherein recursively un-rendering further comprises:

designating the current node as a root of a subtree;

identifying a node as a current un-rendering node, the selection key corresponding thereto being identified as a current un-rendering selection key;

if the current un-rendering selection key is higher than the previous selection criterion, continuing the traversal by recursively designating as a current un-rendering node each child node pointed to by the current un-rendering node;

if the current un-rendering selection key is not higher than the previous selection criterion, un-rendering the curve segment corresponding to the current un-rendering node.

37. The method of claim 35 wherein recursively rendering further comprises:

designating the current node as a root of a subtree;

identifying a node as a current rendering node, the selection key corresponding thereto being identified as a current rendering selection key;

if the current rendering selection key is higher than the current selection criterion, continuing the traversal by recursively designating as a current rendering node each child node pointed to by the current rendering node;

if the current rendering selection key is not higher than the current selection criterion, rendering the curve segment corresponding to the current rendering node.

38. The method of claim 30, further comprising:

identifying a subtree rooted at a sub-root node and containing a subset of the selected nodes, the subset corresponding to a portion of the member compound curve;

locking the subtree to prevent replacement of the subset.

39. The method of claim 38, wherein locking further comprises:

identifying a plurality of root nodes corresponding to a plurality of sub-trees in the multi-curve object.

subdividing the multi-curve object into a plurality of multi-curve objects, each rooted at a respective root node of the plurality of root nodes.

40. The method of claim 21, wherein providing a graph is done iteratively.

41. The method of claim 40, wherein providing a graph further comprises:

identifying a node sequence comprising leaf nodes of the graph;

identifying a working sequence containing candidate nodes to be considered for inclusion as children of a next parent node;

identifying a consolidation number reflecting a number of child nodes to be linked with a parent node in the graph;

identifying sub-sequences, selected from the working sequence, each containing a number of nodes, the number corresponding to the consolidation number;

fitting a candidate curve segment to each of the sub-sequences;

determining an error corresponding to each candidate curve segment;

comparing the errors to select from the candidate curve segments a best curve segment corresponding to a least error of the errors and a best sub-sequence of the sub-sequences;

providing the next parent node storing a characterization of the best curve segment and a selection key corresponding to the least error, and linked to the child nodes selected from the best sub-sequence;

replacing, by the next parent node, in the working sequence, the nodes corresponding to the best sub-sequence;

returning to the identifying sub-sequences step, until the working set contains a single node, identifiable as a primal root node of the graph.

42. The method of claim 41, wherein the returning step further comprises:

returning to the identifying a consolidation number step, and continuing to the identifying sub-sequences step.

43. The method of claim 21, wherein providing a graph further comprises:

selecting all leaf nodes corresponding to a single parent node of the plurality of nodes;

comparing a parent error corresponding to the parent node to a least leaf error selected from the leaf errors corresponding to each, respective, selected, leaf node;

deleting the selected leaf nodes if the parent error is not greater than the least leaf error;

converting the parent node to a leaf node by providing termination values to replace the references linking the parent node to the selected leaf nodes.

44. The method of claim 21, further comprising:

identifying an attribute corresponding to at least one node;

identifying a root node corresponding to a subtree to which the at least one node pertains;

locking the subtree to prevent alteration of the attribute.

* * * * *